(12) United States Patent
Hirose et al.

(10) Patent No.: US 8,928,774 B2
(45) Date of Patent: Jan. 6, 2015

(54) IMAGE CAPTURE APPARATUS

(75) Inventors: Minoru Hirose, Kawasaki (JP); Mineo Uchida, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 39 days.

(21) Appl. No.: 13/988,531

(22) PCT Filed: Nov. 22, 2011

(86) PCT No.: PCT/JP2011/077448
§ 371 (c)(1),
(2), (4) Date: May 21, 2013

(87) PCT Pub. No.: WO2012/073916
PCT Pub. Date: Jun. 7, 2012

(65) Prior Publication Data
US 2013/0250154 A1    Sep. 26, 2013

(30) Foreign Application Priority Data

Dec. 3, 2010  (JP) .................. 2010-270794

(51) Int. Cl.
| | | |
|---|---|---|
| H04N 5/228 | (2006.01) | |
| H04N 5/235 | (2006.01) | |
| H04N 5/347 | (2011.01) | |
| H04N 5/369 | (2011.01) | |
| H04N 9/04 | (2006.01) | |
| H04N 5/232 | (2006.01) | |

(52) U.S. Cl.
CPC ........... *H04N 5/235* (2013.01); *H04N 5/23212* (2013.01); *H04N 5/347* (2013.01); *H04N 5/3696* (2013.01); *H04N 9/045* (2013.01)
USPC .................. 348/222.1; 348/345; 348/333.11; 348/230.1

(58) Field of Classification Search
CPC .......... H04N 5/23216; H04N 5/23219; H04N 5/23245; H04N 5/23296; H04N 5/2254; H04N 1/2125; H04N 5/2354; H04N 9/04; H04N 9/643
USPC ......................................... 396/76; 250/201.8
See application file for complete search history.

(56) References Cited

U.S. PATENT DOCUMENTS

| | | | |
|---|---|---|---|
| 6,829,008 B1 | 12/2004 | Kondo et al. | |
| 8,098,321 B2 * | 1/2012 | Shimoda et al. | 348/349 |

(Continued)

FOREIGN PATENT DOCUMENTS

| | | |
|---|---|---|
| JP | 2000-156823 A | 6/2000 |
| JP | 2003-009003 A | 1/2003 |

(Continued)

*Primary Examiner* — Hung Lam
(74) *Attorney, Agent, or Firm* — Fitzpatrick, Cella, Harper & Scinto

(57) ABSTRACT

This invention includes an image sensor in which image forming pixels and focus detecting pixels which receive light beams from the exit pupil of the imaging lens which is partly light-shielded are arranged, the first vertical output line which outputs a signal from the image forming pixel in the vertical direction of the image sensor, a second vertical output line which outputs a signal from the focus detecting pixel in the vertical direction of the image sensor, a vertical addition unit which adds signals from a plurality of image forming pixels in the vertical direction, and a control unit which controls the vertical addition unit to add only signals from image forming pixels excluding focus detecting pixels, when the focus detecting pixels are included in targets for addition in the addition readout mode of making the vertical addition unit add signals from a plurality of image forming pixels.

7 Claims, 31 Drawing Sheets

(56) References Cited

U.S. PATENT DOCUMENTS

| | | |
|---|---|---|
| 8,102,463 B2 | 1/2012 | Komaba et al. |
| 8,164,679 B2 * | 4/2012 | Kusaka .......... 348/345 |
| 8,269,880 B2 * | 9/2012 | Kusaka .......... 348/350 |
| 8,345,112 B2 | 1/2013 | Ueda |
| 2010/0188532 A1 * | 7/2010 | Kusaka et al. .......... 348/240.99 |
| 2011/0096189 A1 * | 4/2011 | Taniguchi .......... 348/222.1 |
| 2012/0138773 A1 * | 6/2012 | Taniguchi .......... 250/208.1 |

FOREIGN PATENT DOCUMENTS

| | | |
|---|---|---|
| JP | 2008-263452 A | 10/2008 |
| JP | 2009-086424 A | 4/2009 |
| JP | 2009-089143 A | 4/2009 |
| JP | 2010-020055 A | 1/2010 |

* cited by examiner

FIG. 6A

|    | 0 | 1 | 2 | 3 | 4 | 5 | 6 | 7 | 8 | 9 | 10 | 11 | 12 | 13 |
|----|---|---|---|---|---|---|---|---|---|---|----|----|----|----|
| 0  | R | G | R | G | R | G | R | G | R | G | R  | G  | R  | G  |
| 1  | G | B | G | B | G | B | G | B | G | B | G  | B  | G  | B  |
| 2  | R | G | R | G | R | G | R | G | R | G | R  | G  | R  | G  |
| 3  | G | B | G | B | G | B | G | B | G | B | G  | B  | G  | B  |
| 4  | R | G | R | G | R | G | R | G | R | G | R  | G  | R  | G  |
| 5  | G | B | G | B | G | B | G | B | G | B | G  | B  | G  | B  |
| 6  | R | G | R | G | R | G | R | G | R | G | R  | G  | R  | G  |
| 7  | G | B | G | B | G | B | G | B | G | B | G  | B  | G  | B  |
| 8  | R | G | R | G | R | G | R | G | R | G | R  | G  | R  | G  |
| 9  | G | B | G | B | G | B | G | B | G | B | G  | B  | G  | B  |
| 10 | R | G | R | G | R | G | R | G | R | G | R  | G  | R  | G  |
| 11 | G | B | G | B | G | B | G | B | G | B | G  | B  | G  | B  |
| 12 | R | G | R | G | R | G | R | G | R | G | R  | G  | R  | G  |
| 13 | G | B | G | B | G | B | G | B | G | B | G  | B  | G  | B  |
| 14 | R | G | R | G | R | G | R | G | R | G | R  | G  | R  | G  |
| 15 | G | B | G | B | G | B | SHB | G | B | G | B | G | B | G |
| 16 | R | G | R | G | R | G | R | G | R | G | R  | G  | R  | G  |
| 17 | G | B | G | B | G | B | G | B | G | B | G  | B  | G  | B  |
| 18 | R | G | R | G | R | G | SHA | G | R | G | R | G | R | G |
| 19 | G | B | G | B | G | B | G | B | G | B | G  | B  | G  | B  |
| 20 | R | G | R | G | R | G | R | G | R | G | R  | G  | R  | G  |
| 21 | G | B | G | B | G | B | G | B | G | B | G  | B  | G  | B  |
| 22 | R | G | R | G | R | G | R | G | R | G | R  | G  | R  | G  |
| 23 | G | B | G | B | G | B | G | B | G | B | G  | B  | G  | B  |

ARRANGEMENT OF ALL PIXELS

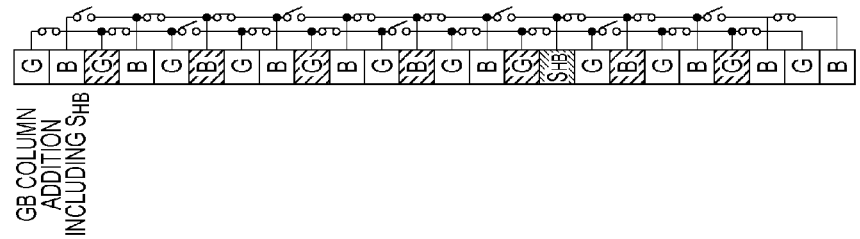
FIG. 6E GB COLUMN ADDITION INCLUDING S_HB
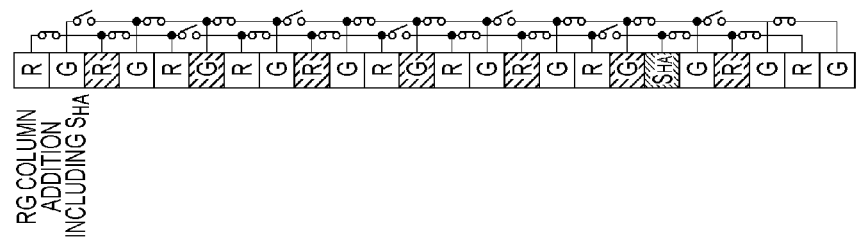
FIG. 6D RG COLUMN ADDITION INCLUDING S_HA
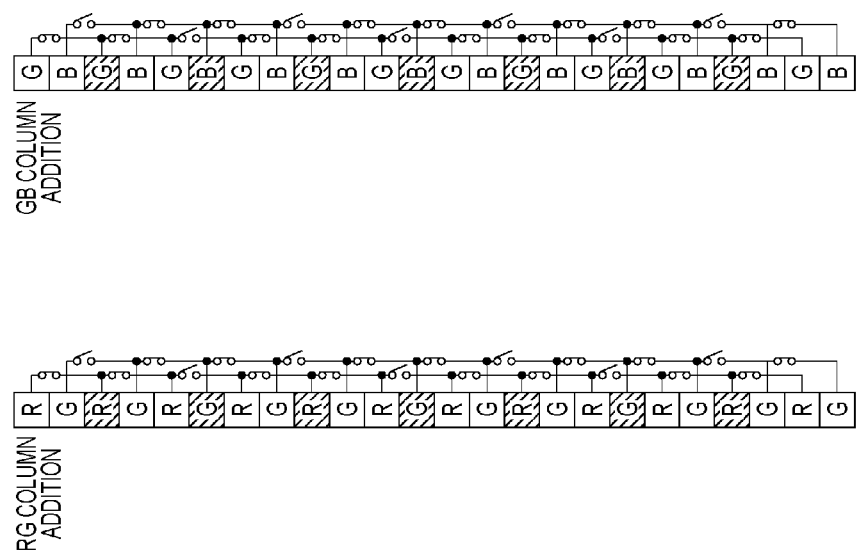
FIG. 6C GB COLUMN ADDITION
FIG. 6B RG COLUMN ADDITION F I G. 6F  RG ROW ADDITION
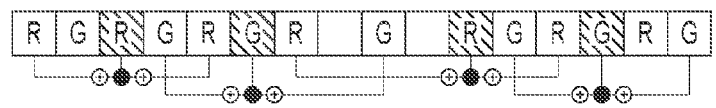
F I G. 6G  GB ROW ADDITION
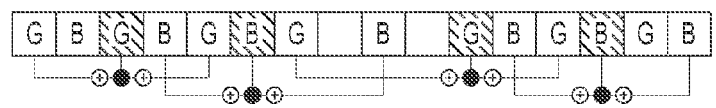
F I G. 6H  RG ROW ADDITION INCLUDING $S_{HA}$
F I G. 6I  GB ROW ADDITION INCLUDING $S_{HB}$
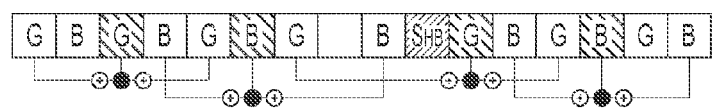

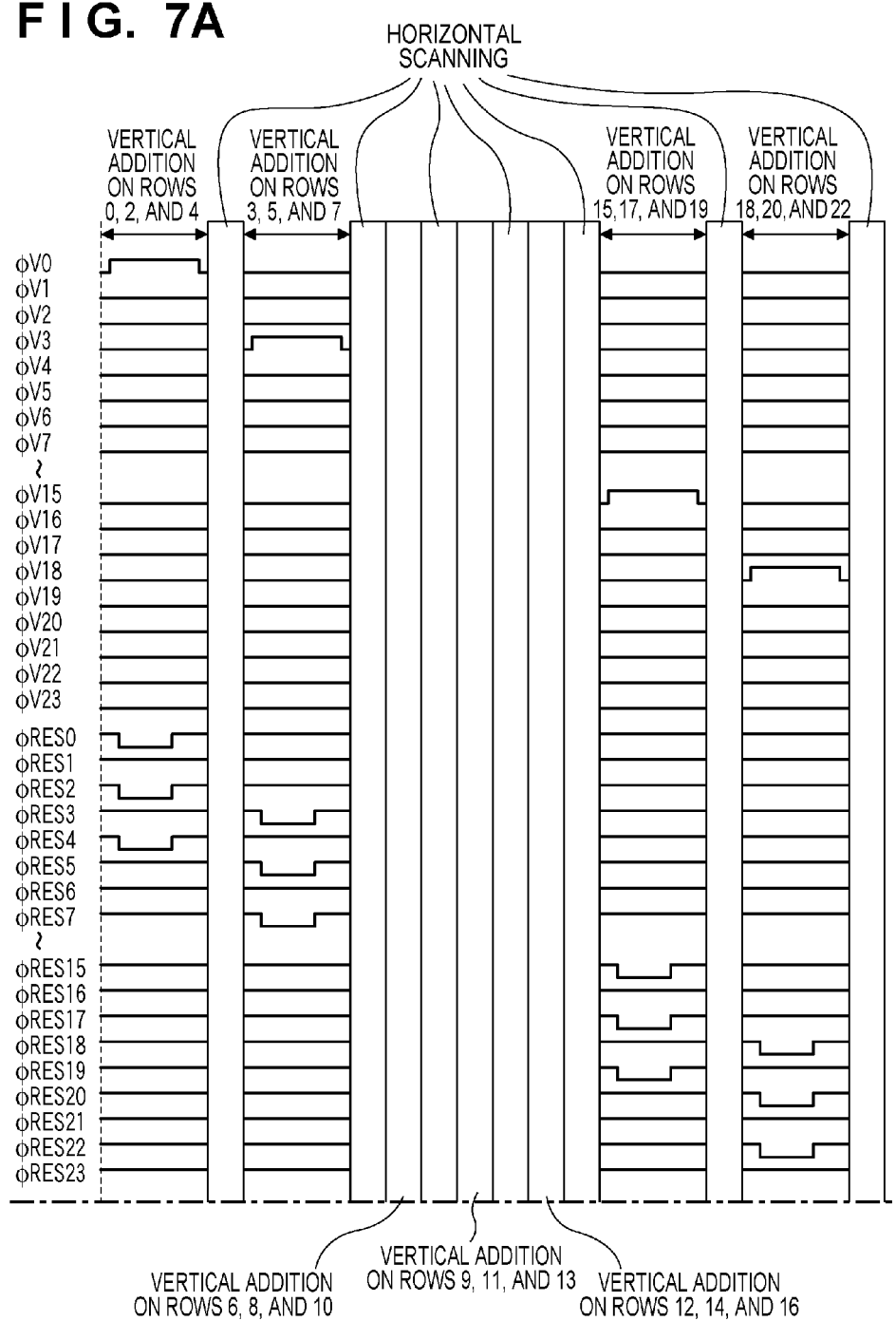

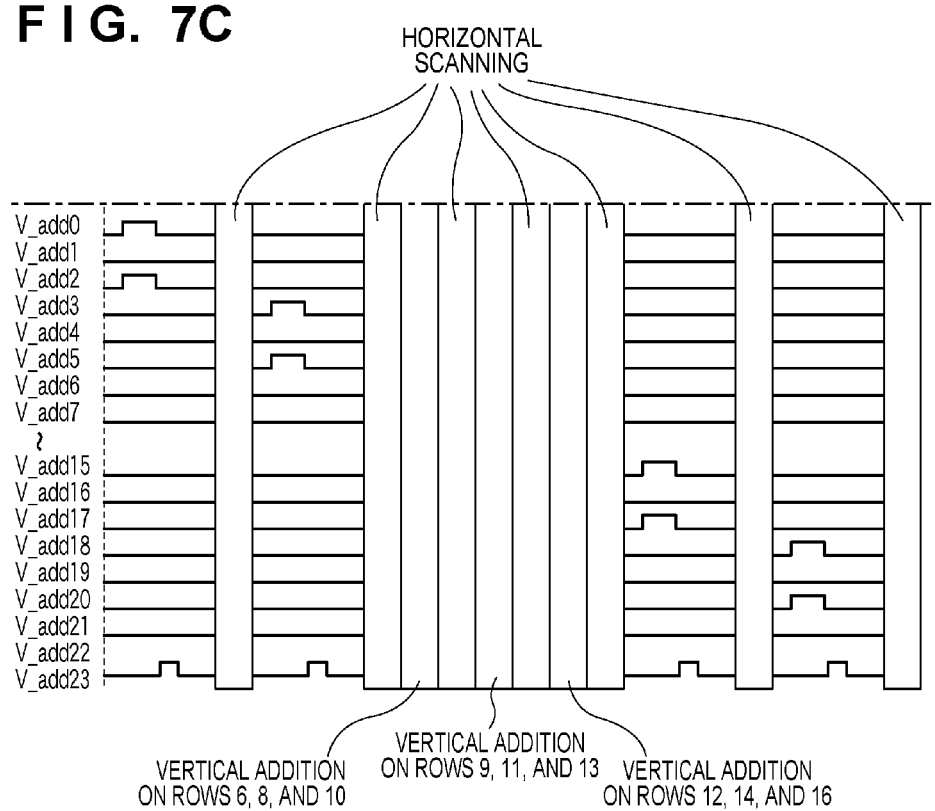

FIG. 9A

ARRANGEMENT OF ALL PIXELS

FIG. 9B  RG COLUMN ADDITION

FIG. 9C  GB COLUMN ADDITION

FIG. 9D  RG COLUMN ADDITION INCLUDING ShA

FIG. 9E  GB COLUMN ADDITION INCLUDING ShB

F I G. 9F  RG ROW ADDITION
F I G. 9G  GB ROW ADDITION
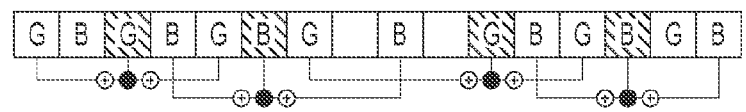
F I G. 9H  RG ROW ADDITION INCLUDING $S_{HA}$
F I G. 9I  GB ROW ADDITION INCLUDING $S_{HB}$
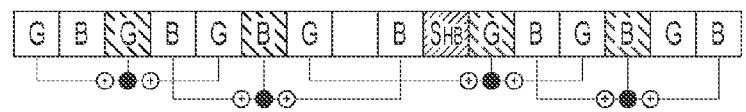

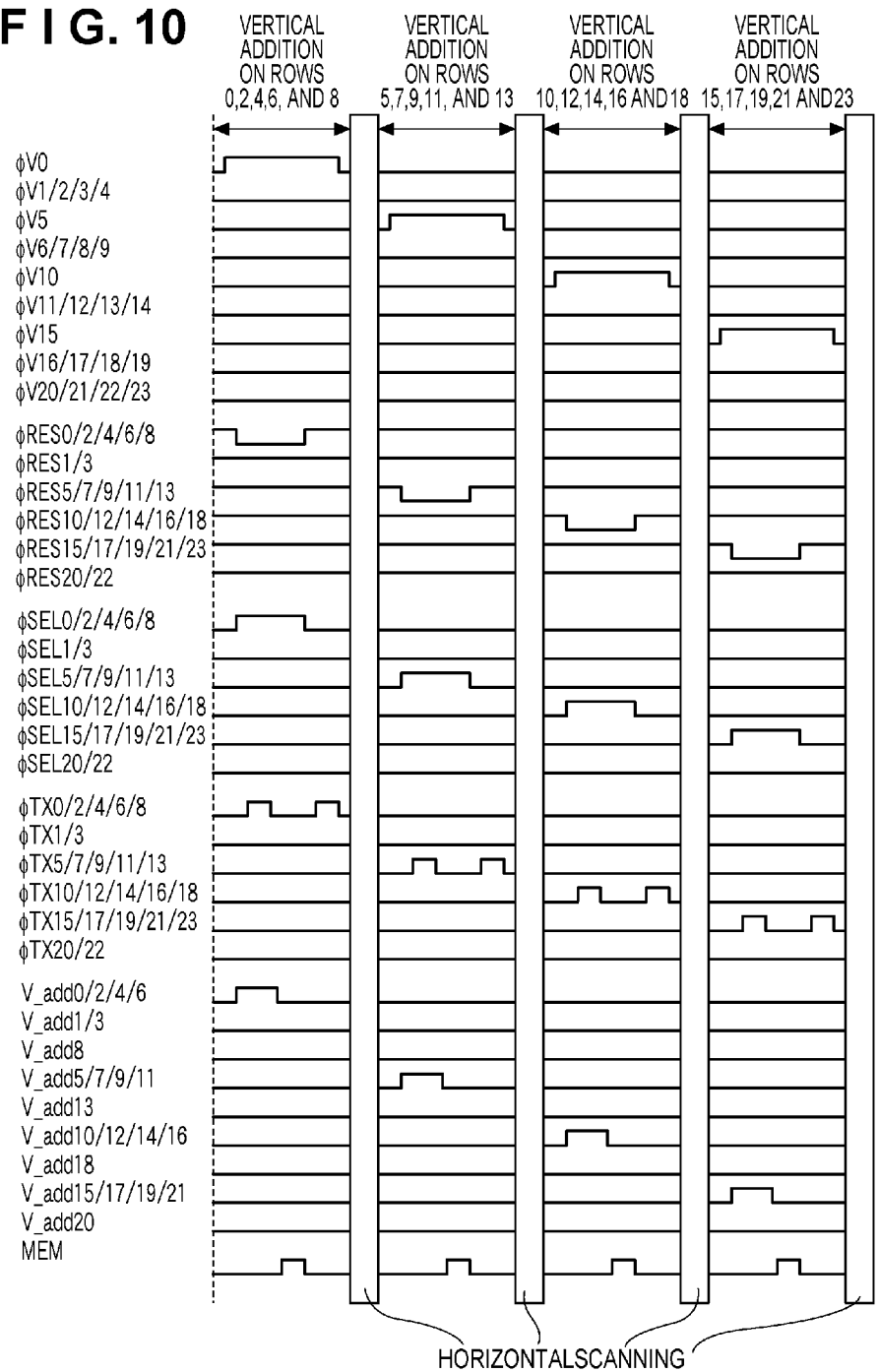

FIG. 13A

ARRANGEMENT OF ALL PIXELS

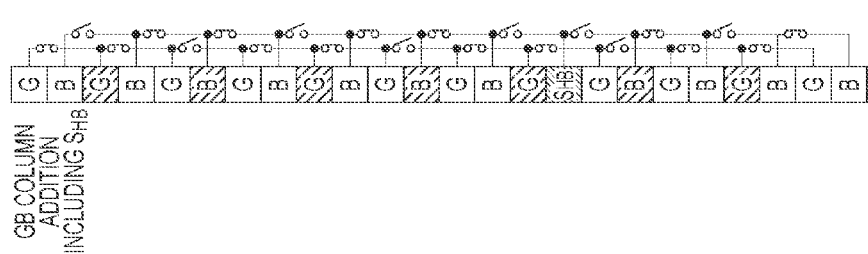
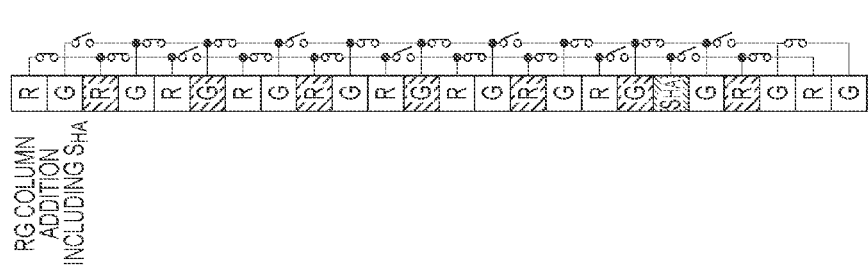
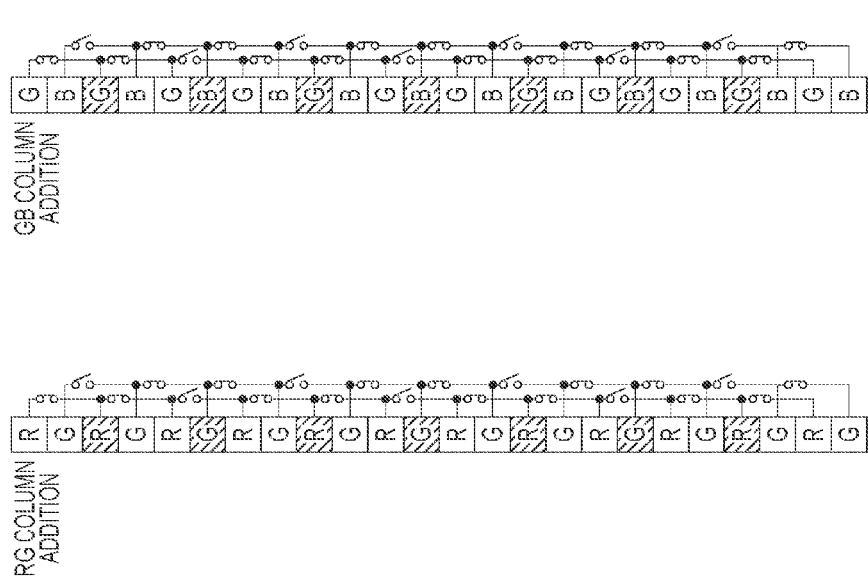

FIG. 13F  RG ROW ADDITION
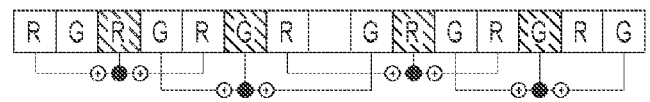
FIG. 13G  GB ROW ADDITION
FIG. 13H  RG ROW ADDITION INCLUDING $S_{HA}$
FIG. 13I  GB ROW ADDITION INCLUDING $S_{HB}$

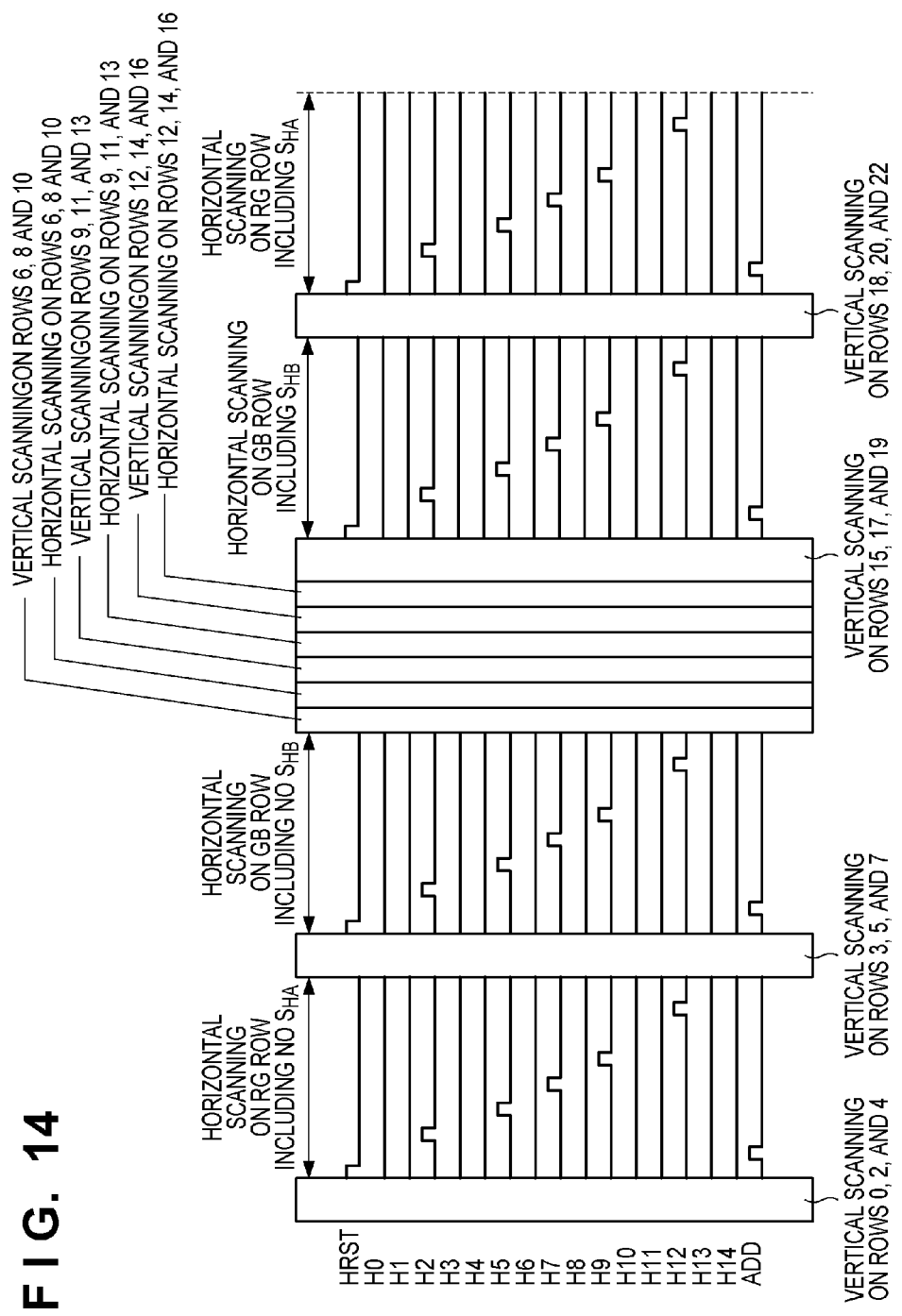

F I G. 18A

|    | 0 | 1 | 2  | 3 | 4 | 5  | 6   | 7 | 8  | 9 | 10 | 11 | 12 | 13 |
|----|---|---|----|---|---|----|-----|---|----|---|----|----|----|----|
| 0  | R | G | R  | G | R | G  | R   | G | R  | G | R  | G  | R  | G  |
| 1  | G | B | G  | B | G | B  | G   | B | G  | B | G  | B  | G  | B  |
| 2  | R | G | R  | G | R | G  | R   | G | R  | G | R  | G  | R  | G  |
| 3  | G | B | G  | B | G | B  | G   | B | G  | B | G  | B  | G  | B  |
| 4  | R | G | R  | G | R | G  | R   | G | R  | G | R  | G  | R  | G  |
| 5  | G | B | G  | B | G | B  | G   | B | G  | B | G  | B  | G  | B  |
| 6  | R | G | R  | G | R | G  | R   | G | R  | G | R  | G  | R  | G  |
| 7  | G | B | G  | B | G | B  | G   | B | G  | B | G  | B  | G  | B  |
| 8  | R | G | R  | G | R | G  | R   | G | R  | G | R  | G  | R  | G  |
| 9  | G | B | G  | B | G | B  | G   | B | G  | B | G  | B  | G  | B  |
| 10 | R | G | R  | G | R | G  | R   | G | R  | G | R  | G  | R  | G  |
| 11 | G | B | G  | B | G | B  | G   | B | G  | B | G  | B  | G  | B  |
| 12 | R | G | R  | G | R | G  | R   | G | R  | G | R  | G  | R  | G  |
| 13 | G | B | G  | B | G | B  | G   | B | G  | B | G  | B  | G  | B  |
| 14 | R | G | R  | G | R | G  | R   | G | R  | G | R  | G  | R  | G  |
| 15 | G | B | G  | B | G | B  | G   | SHB | G | B | G  | B  | G  | B  |
| 16 | R | G | R  | G | R | G  | R   | G | R  | G | R  | G  | R  | G  |
| 17 | G | B | G  | B | G | B  | G   | B | G  | B | G  | B  | G  | B  |
| 18 | R | G | R  | G | R | G  | SHA | G | R  | G | R  | G  | R  | G  |
| 19 | G | B | G  | B | G | B  | G   | B | G  | B | G  | B  | G  | B  |
| 20 | R | G | R  | G | R | G  | R   | G | R  | G | R  | G  | R  | G  |
| 21 | G | B | G  | B | G | B  | G   | B | G  | B | G  | B  | G  | B  |
| 22 | R | G | R  | G | R | G  | R   | G | R  | G | R  | G  | R  | G  |
| 23 | G | B | G  | B | G | B  | G   | B | G  | B | G  | B  | G  | B  |

ARRANGEMENT OF ALL PIXELS

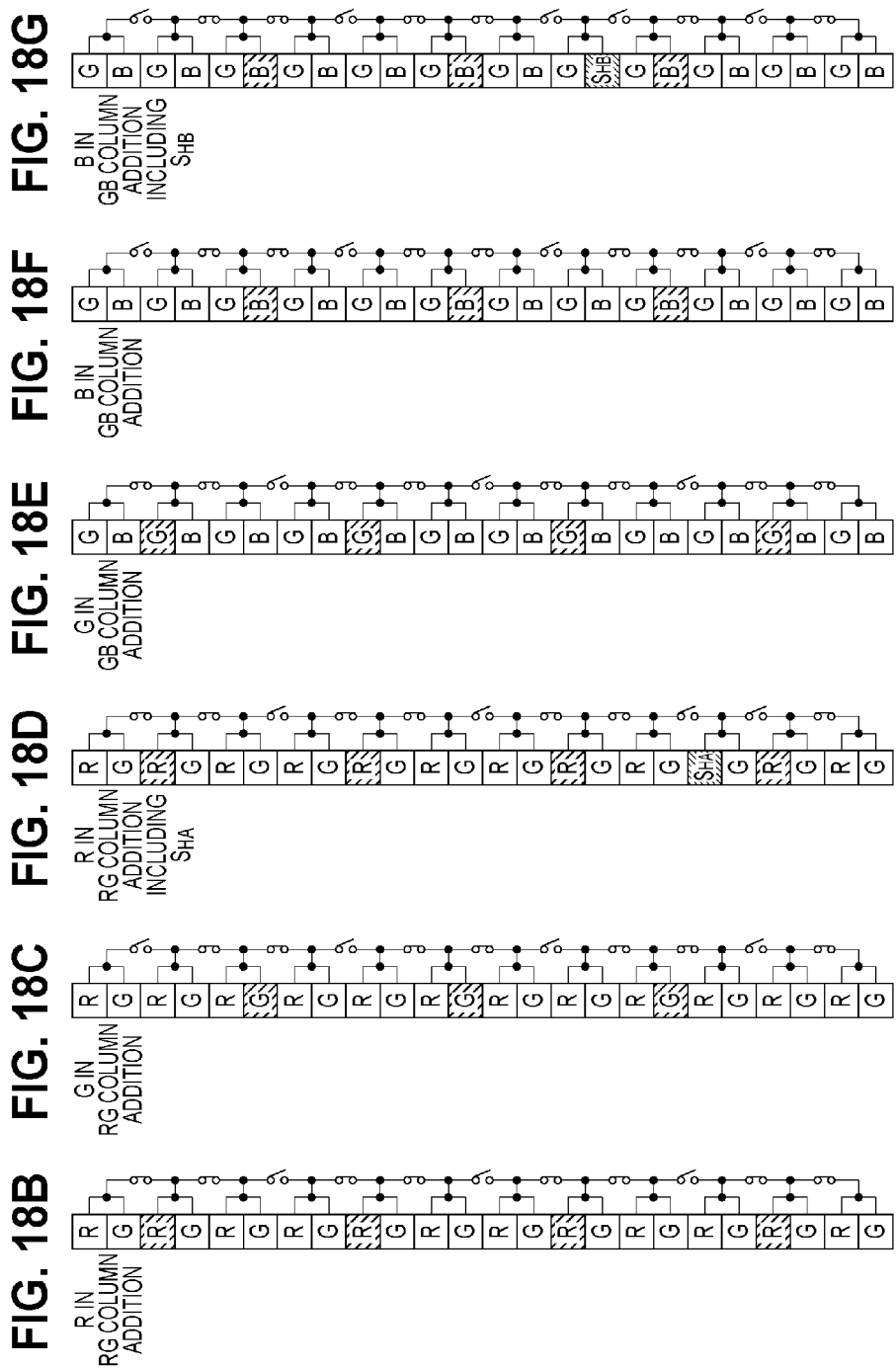

F I G. 18H RG ROW ADDITION
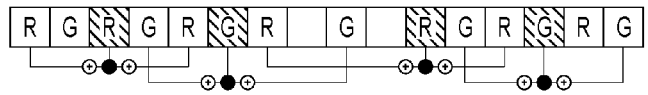
F I G. 18I GB ROW ADDITION
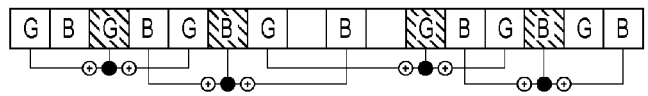
F I G. 18J RG ROW ADDITION INCLUDING $S_{HA}$
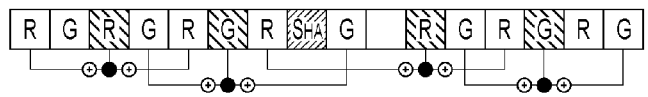
F I G. 18K GB ROW ADDITION INCLUDING $S_{HB}$
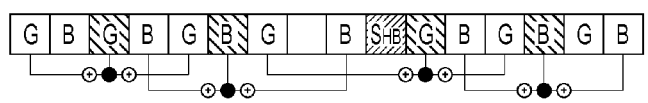
F I G. 18L GB ROW ADDITION INCLUDING PIXELS PARTLY SHARING CIRCUIT WITH $S_{HA}$
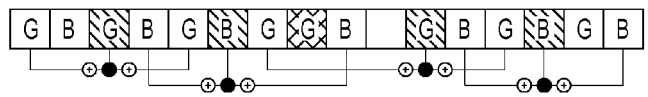
F I G. 18M RG ROW ADDITION INCLUDING PIXELS PARTLY SHARING CIRCUIT WITH $S_{HB}$
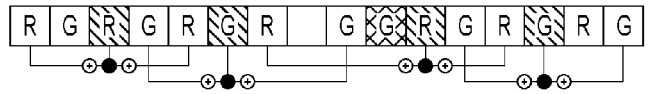

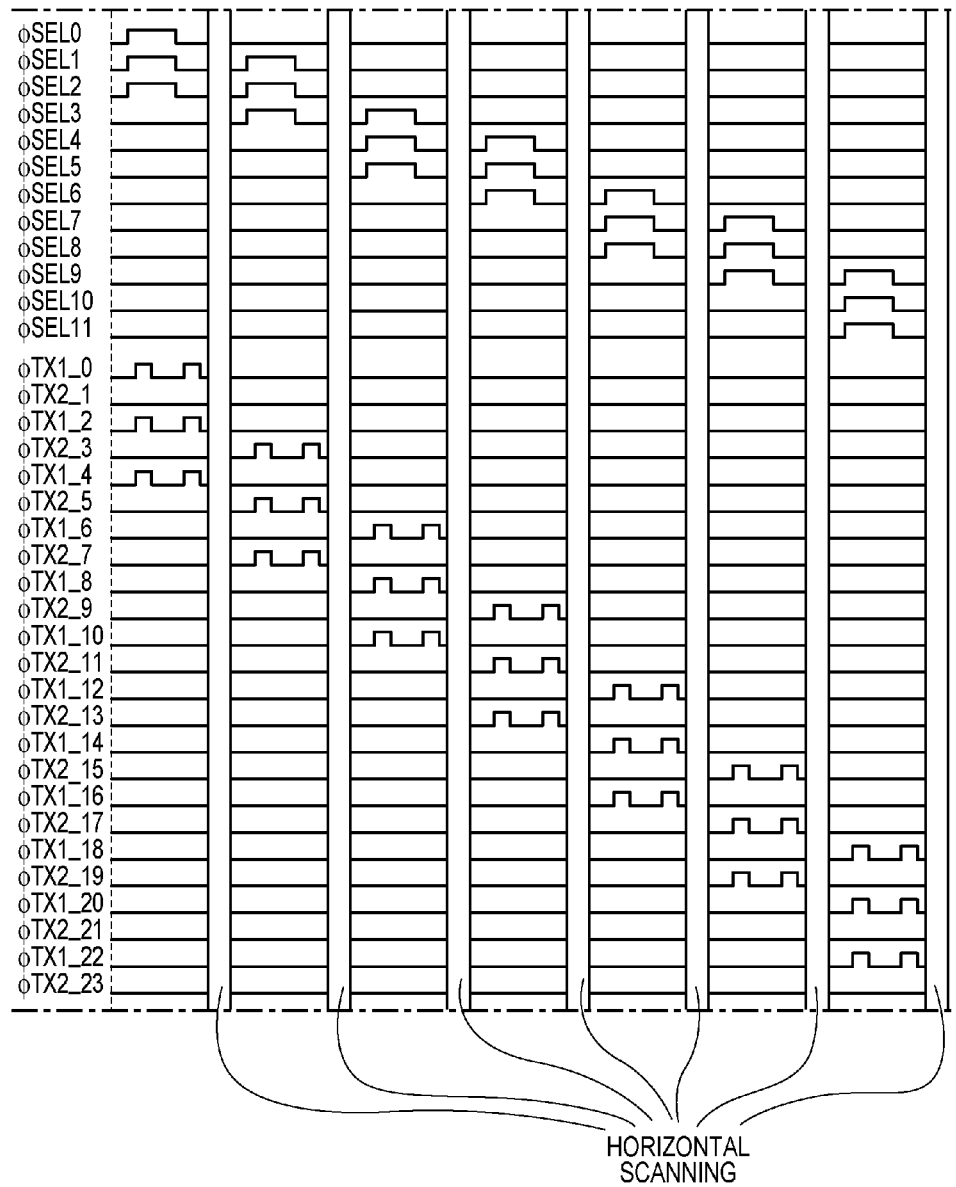

IMAGE CAPTURE APPARATUS

TECHNICAL FIELD

The present invention relates to an image capture apparatus including an image sensor constituted by many photoelectric conversion elements.

BACKGROUND ART

Recently, digital cameras and video cameras using CCD and CMOS type solid-state image sensors have generally been in widespread use. Such a digital camera or video camera is equipped with an auto-focus (to be abbreviated as AF hereinafter) function to automatically adjust the focus position of an imaging lens. Compact cameras and video cameras perform contrast system AF to adjust a focus state by evaluating the contrast of an image signal.

In a digital single-lens reflex camera, when performing still image capturing by using an optical finder, a dedicated phase difference focus detecting device performs AF by splitting an image light beam into light beams for the optical finder and a focus detection means using a quick return mirror. In electronic viewfinder image capturing or moving image capturing, the camera retracts the quick return mirror to guide an image light beam to only the solid-state image sensor, thereby performing contrast system AF like compact cameras and video cameras.

A dedicated phase difference focus detecting device, however, is disadvantageous in terms of space and cost. The contrast system is incapable of quick focus adjustment because it searches for a position where the contrast of an image signal is maximized while changing the focus position of the imaging lens.

In order to solve the above problems, there has been proposed a technique of providing a pupil dividing function for some light-receiving elements (pixels) of an image sensor by decentering the sensitivity region of a light-receiving portion relative to the optical axis of an on-chip microlens and using these pixels as focus detecting pixels. Arranging focus detecting pixels among image forming pixels at predetermined intervals can implement fast phase difference system AF even in electronic viewfinder image capturing or moving image capturing (see Japanese Patent Laid-Open No. 2000-156823).

In addition, there has been proposed a technique of, when performing fast readout operation by adding a plurality of pixel signals in electronic viewfinder image capturing or moving image capturing, adding and reading out pixel signals for the respective types so as not to mix signal outputs from the image forming pixels and the focus detecting pixels. This makes it possible to perform focus detection while suppressing a deterioration in the image quality of a displayed image (see Japanese Patent Laid-Open No. 2009-86424).

The following technique has also been proposed for an addition readout mode of reading out pixels from an image sensor while adding them to prevent a deterioration in image quality caused by moire fringes in electronic viewfinder image capturing or moving image capturing. That is, when targets for addition include focus detecting pixels, readout operation is performed so as not to mix signals from image forming pixels and signals from focus detecting pixels (see Japanese Patent Laid-Open No. 2010-20055).

Conventionally, however, when the electronic viewfinder mode or moving image capturing mode is set in an image capture apparatus designed to perform phase difference AF using an image sensor, the apparatus cannot perform focus detection while suppressing a deterioration in image quality.

For example, according to Japanese Patent Laid-Open No. 2000-156823, since the portions where the focus detecting pixels are arranged correspond to lost portions in terms of image signal, image information is generated by interpolation using adjacent image forming pixel information. It is therefore impossible to prevent a deterioration in image quality caused by interpolation errors. In addition, in the electronic viewfinder mode or moving image capturing operation, the apparatus reads out signals from pixels while thinning out pixels, resulting in a deterioration in image quality caused by moire fringes.

In addition, the technique disclosed in Japanese Patent Laid-Open No. 2009-86424 performs pixel addition in the electronic viewfinder mode or moving image capturing operation to suppress the generation of moire fringes, thus suppressing a deterioration in image quality. Likewise, however, since the portions where the focus detecting pixels are arranged correspond to lost portions in terms of image signal, image information is generated by interpolation using adjacent image forming pixel information. It is therefore impossible to prevent a deterioration in image quality caused by interpolation errors. Furthermore, it is necessary to transfer signals to a line memory for each line when performing pixel addition in the vertical direction. This leads to delays caused by vertical transfer, and hence makes it difficult to cope with a high frame rate.

According to Japanese Patent Laid-Open No. 2010-20055, when pixels to be added in the horizontal direction include focus detecting pixels, the addition result obtained without adding signals from the focus detecting pixels can be independently output. However, there is no specific description about addition in the vertical direction.

SUMMARY OF INVENTION

The present invention has been made in consideration of the above problems, and suppresses, in an image sensor having focus detecting pixels arranged among image forming pixels, a deterioration in image quality caused by the presence of the focus detecting pixels.

According to the present invention, there is provided an image capture apparatus characterized by comprising: an image sensor in which image forming pixels which receive light beams passing through an exit pupil of an imaging lens and focus detecting pixels which receive light beams from the exit pupil of the imaging lens which is partly light-shielded are arranged; first vertical output means for outputting a signal from the image forming pixel in a vertical direction of the image sensor; second vertical output means for outputting a signal from the focus detecting pixel in the vertical direction of the image sensor; vertical addition means for adding signals from a plurality of image forming pixels in the vertical direction of the image sensor; and control means, having an all pixel readout mode of reading out signals from all pixels of the image sensor without addition and an addition readout mode of making the vertical addition means add and read out signals from the plurality of image forming pixels, for controlling, when the focus detecting pixel is included in targets for addition in the addition readout mode, the vertical addition means to add only signals from the image forming pixels excluding the focus detecting pixel, and to make the first vertical output means and the second vertical output means simultaneously output the addition signals from the image forming pixels and the signal from the focus detecting pixel.

Further features of the present invention will become apparent from the following description of exemplary embodiments with reference to the attached drawings.

BRIEF DESCRIPTION OF DRAWINGS

FIGS. 6A to 6I are views for explaining the pixel arrangements and horizontal/vertical addition of the image sensor according to the first embodiment;

FIGS. 7A to 7C are timing charts of the vertical transfer of the image sensor according to the first embodiment;

FIGS. 9A to 9I are views for explaining the pixel arrangements and horizontal/vertical addition of the image sensor according to the first embodiment;

FIG. 10 is a timing chart of the vertical transfer of the image sensor according to the first embodiment;

FIGS. 13A to 13I are views for explaining the pixel arrangements and horizontal/vertical addition of the image sensor according to the second embodiment;

FIG. 14 is a timing chart of the horizontal transfer of the image sensor according to the second embodiment;

FIGS. 18A to 18M are views for explaining the pixel arrangements and vertical addition of the image sensor according to the third embodiment; and FIGS. 19A to 19C are timing charts of the vertical transfer of the image sensor according to the third embodiment.

DESCRIPTION OF EMBODIMENTS

The embodiments of the present invention will be described in detail below with reference to the accompanying drawings.

First Embodiment

Figure 1:
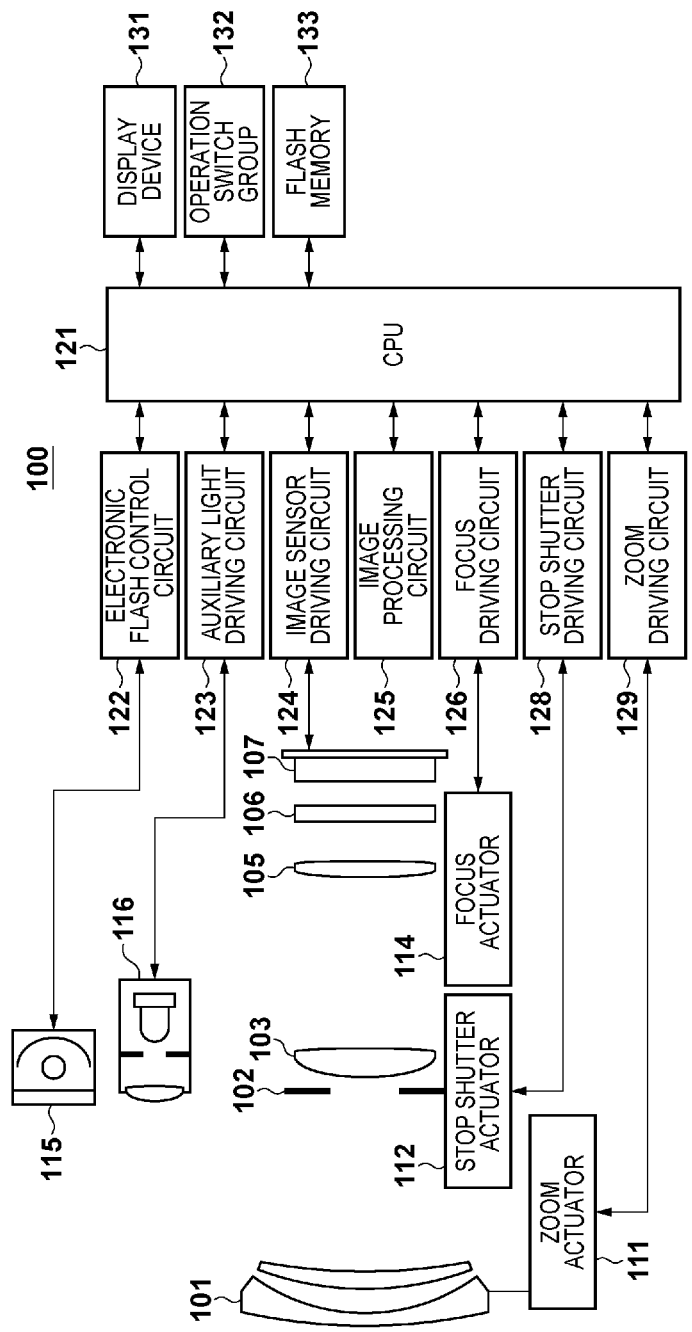
FIG. 1 is a block diagram of a camera according to the first embodiment.

FIG. 1 is a block diagram showing the arrangement of a digital camera 100 as the first embodiment of an image capture apparatus of the present invention. Referring to FIG. 1, reference numeral 101 denotes a first lens group placed at the distal end of an imaging optical system, which is retractably held in the optical axis direction; 102, a shutter which also serves as a stop, performs light amount adjustment at the time of image capturing by adjusting the aperture size, and functions as a shutter for exposure time adjustment at the time of still image capturing; and 103, a second lens group. The stop/shutter 102 and the second lens group 103 integrally move in the optical axis direction, and implement a magnifying function (zoom function) in cooperation with the movement of the first lens group 101. Reference numeral 105 denotes a third lens group including a focus lens, which performs focus adjustment by moving in the optical axis direction; 106, an optical low-pass filter, which is an optical element for reducing the false color and moire fringes of a captured image; and 107, an image sensor constituted by a CMOS sensor and its peripheral circuits. As the image sensor 107, a two-dimensional single-plate color sensor is used, which is formed from on-chip primary color mosaic filters in a Bayer arrangement formed on horizontal m light-receiving pixels×vertical n light-receiving pixels. The image sensor 107 includes a plurality of image forming pixels and a plurality of focus detecting pixels.

Reference numeral 111 denotes a zoom actuator which performs magnifying operation by making a cam cylinder (not shown) pivot to drive the first to third lens groups 101 to 105 in the optical axis direction; 112, a stop shutter actuator, which adjusts an imaging light amount by controlling the aperture size of the stop/shutter 102 and also controls the exposure time at the time of still image capturing; 114, a focus actuator, which drives the third lens group 105 in the optical axis direction; 115, an electronic flash for illuminating an object with light at the time of image capturing; and 116, an AF auxiliary light unit, which improves focus detection performance for a dark object or a low-contrast object by projecting an image of a mask having a predetermined aperture pattern on a field.

Reference numeral 121 denotes a CPU, which is a control unit for various kinds control on the camera body. The CPU 121 includes a computation unit, ROM, RAM, A/C converter, D/A converter, and communication interface circuit, and drives various circuits of the camera based on the programs stored in the ROM to execute a series of operations such as AF, image capturing, image processing, and recording. Reference numeral 122 denotes an electronic flash control circuit, which performs lighting control on the electronic flash 115 in synchronism with image capturing operation; and 123, an auxiliary light driving circuit, which performs lighting control on the AF auxiliary light unit 116 in synchronism with focus detecting operation.

Reference numeral 124 denotes an image sensor driving circuit, which controls the image capturing operation of the image sensor 107 and transmits the acquired image signal to the CPU 121 upon A/D conversion; and 125, an image processing circuit, which performs processing such as γ conversion, color interpolation, or JPEG compression for the image acquired by the image sensor 107.

Reference numeral 126 denotes a focus driving circuit, which controls the driving of the focus actuator 114 based on a focus detection result under the control of the CPU 121 and performs focus adjustment by driving the third lens group 105 in the optical axis direction; 128, a stop shutter driving circuit, which controls the aperture of the stop/shutter 102 by controlling the driving of the stop shutter actuator 112; and 129, a zoom driving circuit, which drives the zoom actuator 111 in accordance with zoom operation by an operator.

Reference numeral 131 denotes a display device such as an LCD, which displays information associated with the image capturing mode of the digital camera 100, a preview image before image capturing, a check image after image capturing, and an in-focus state display image at the time of focus detection; 132, an operation switch group, which includes a power switch, release (image capturing trigger) switch, zoom operation switch, and mode selection switch. The mode selection switch functions as a mode setting unit capable of setting a still image capturing mode, moving image capturing mode, or electronic viewfinder mode. In the moving image capturing mode or electronic viewfinder mode, it is possible to set an addition readout mode (or the first addition readout mode or second addition readout mode) (to be described later). Reference numeral 133 denotes a detachable flash memory, which records a captured image.

FIGS. 2A, 2B, 3A, and 3B are views for explaining the structures of image forming and focus detecting pixels. This embodiment includes a plurality of focus detecting pixels which receive light passing through a partial region (a partially light-shielded region) of the exit pupil of the imaging optical system. The embodiment uses a Bayer arrangement in which pixels having G (Green) spectral sensitivity are arranged as two diagonal pixels of four pixels of 2 rows×2 columns (assuming that row=X and column=Y, for example, 2 rows×2 columns is written as 2×2 hereinafter), and pixels respectively having R (Red) spectral sensitivity and B (Blue) spectral sensitivity are respectively arranged as the remaining two pixels. Focus detecting pixels having the structure to be described later are dispersed in the Bayer arrangement.

Figures 2A, 2B:
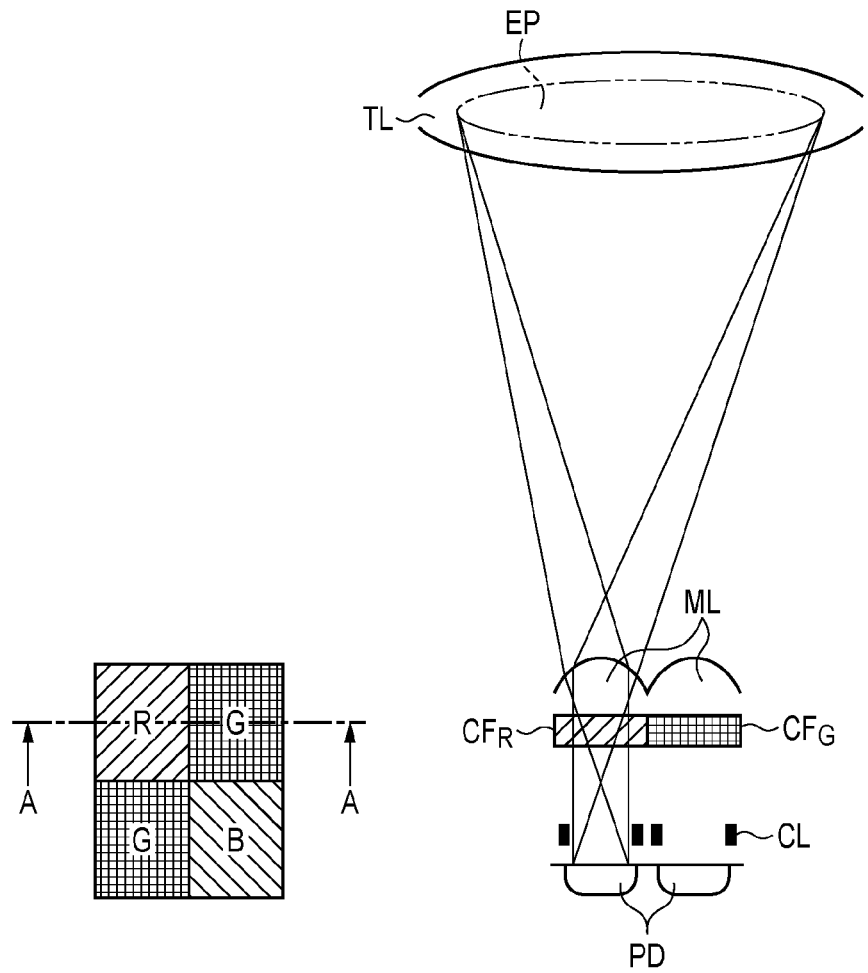
FIGS. 2A and 2B are respectively plan and sectional views of image forming pixels of an image sensor according to the first embodiment.

FIGS. 2A and 2B show the arrangement and structure of image forming pixels. FIG. 2A is a plan view of 2×2 image forming pixels. As is well known, in a Bayer arrangement, G pixels are arranged in a diagonal direction, and R and B pixels are respectively arranged as the remaining two pixels. In this arrangement, 2×2-pixel structures are repeatedly arranged. FIG. 2B is a sectional view taken along a line A-A in FIG. 2A. Reference symbol ML denotes an on-chip microlens placed at the frontmost surface of each pixel; CFR, an R (Red) color filter; CFG, a G (Green) color filter; PD (PhotoDiode), a schematically shown photoelectric conversion unit of a CMOS sensor; CL (ContactLayer), a wiring layer for the formation of signal lines for transmitting various types of signals in the CMOS sensor; and TL (TakingLens), a schematically shown imaging optical system.

The on-chip microlens ML and photoelectric conversion unit PD for each image forming pixel are configured to capture a light beam having passed through the imaging optical system TL as effectively as possible. The on-chip microlens ML makes an exit pupil EP (ExitPupil) and the photoelectric conversion unit PD have a conjugate relationship. In addition, each photoelectric conversion unit PD is designed to have a large effective area. Although FIG. 2B explains an incident light beam on the R pixel, both the G pixel and the B (Blue) pixel have the same structure. Therefore, the exit pupil EP corresponding to each of the image forming R, G, and B pixels has a large aperture size. This makes it possible to efficiently capture a light beam from an object and improve the S/N ratio of an image signal. As described above, a plurality of image forming pixels each generate an image of the object by receiving light passing through the entire region of the exit pupil EP.

Figures 3A, 3B:
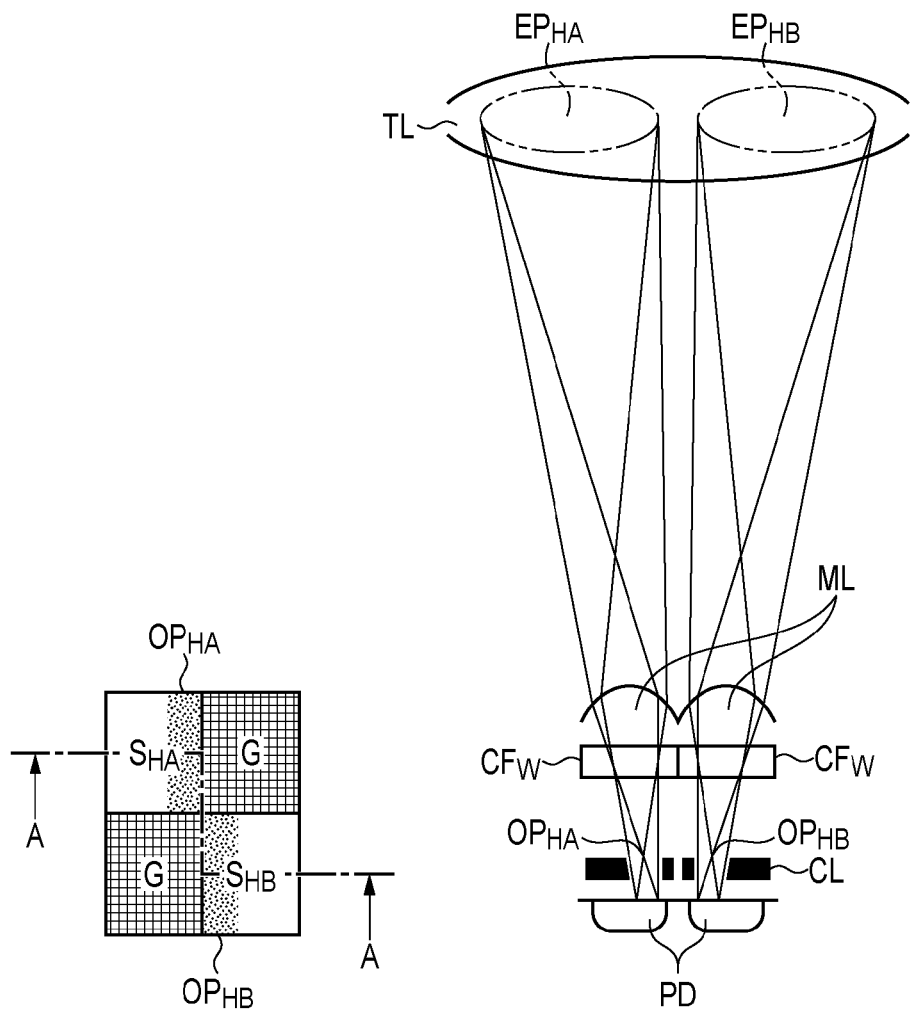
FIGS. 3A and 3B are respectively plan and sectional views of image forming pixels of the image sensor according to the first embodiment.

FIGS. 3A and 3B are views showing the arrangement and structure of focus detecting pixels for pupil division in the horizontal direction (transverse direction or lateral direction) of the imaging optical system TL. In this case, the "horizontal direction" is a direction which is perpendicular to the optical axis of the imaging optical system TL when the optical axis and a long side of the imaging region are parallel to the ground and is parallel to a straight line extending in the horizontal direction. FIG. 3A is a plane view of 2×2 pixels including focus detecting pixels. When obtaining an image signal for recording or observation, the apparatus acquires the main component of luminance information with G pixels. Since the human image recognition characteristic is sensitive to the luminance information, deterioration in image quality is likely to be recognized when the G pixels are lost. In contrast, although the R pixel or the B pixel is a pixel for the acquisition of color information (color difference information), the human vision characteristic is insensitive to the color information. For this reason, even when a smaller number of pixels used to obtain color information are lost, deterioration in image quality is less likely to be recognized. Accordingly, this embodiment saves the G pixels as image forming pixels in the 2×2 pixels, and replaces the R and B pixels with focus detecting pixels. These focus detecting pixels are shown as SHA and SHB in FIG. 3A.

FIG. 3B is a sectional view taken along a line A-A in FIG. 3A. The microlens ML and the photoelectric conversion unit PD have the same structures as those of the image forming pixel shown in FIG. 2B. This embodiment does not use a signal from the focus detecting pixel to generate an image, and places a transparent (white) film CF instead of a color filter for color separation. In addition, in order to perform pupil division in the image sensor 107, the opening portion of the wiring layer CL is shifted in one direction with respect to the center line of the microlens ML. More specifically, a pixel SHA and an opening portion OPHA shift to the right, and receive a light beam having passed through a left exit pupil EPHA of the imaging optical system TL. An opening portion OPHB of a pixel SHB shifts to the left, and receives a light beam having passed through a right exit pupil EPHB of the imaging optical system TL. The pixels SHA are regularly arranged in the horizontal direction, and an object image obtained by these pixels will be referred to as an A image. The pixels SHB are also regularly arranged in the horizontal direction, and an object image obtained by these pixels will be referred to as a B image. Detecting the relative positions of the A image and B image can detect the blur amount (defocus amount) of the object image.

Figure 4:
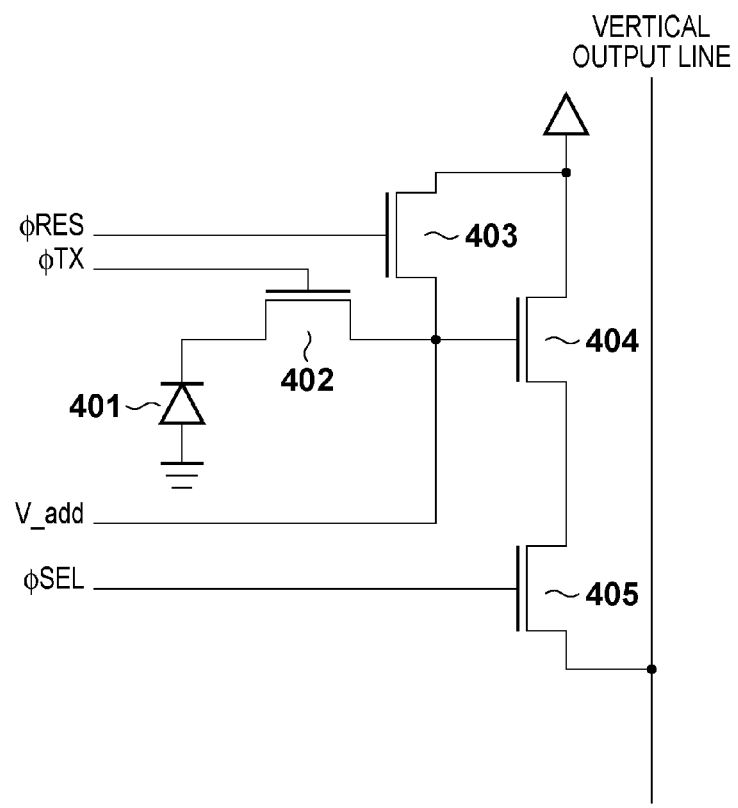
FIG. 4 is a circuit diagram of a pixel portion of the image sensor according to the first embodiment.

FIG. 4 is a circuit diagram showing a circuit corresponding to one pixel portion of a CMOS image sensor used in this embodiment. Reference numeral 401 denotes a photodiode which receives reflected light from an object which strikes the imaging lens, and performs photoelectric conversion; 402, a charge-transfer MOS transistor which transfers the signal charge stored in the photodiode to the capacitor of a floating diffusion unit (to be referred to as an FD hereinafter) (to be described later), and is controlled by a signal φTX; 403, a reset MOS transistor which resets the photodiode and the FD capacitor and is controlled by a signal φRES; and 404, a source follower amplifier which has an FD capacitor (not shown) at the gate portion and coverts the signal charge transferred to the FD capacitor into a voltage. In addition, in order to allow the addition of pixel outputs in the vertical direction, an addition signal line V_add is connected to the gate of the source follower amplifier 404, that is, the FD capacitor. A more specific addition method will be described later. Reference numeral 405 denotes a pixel selection MOS transistor, which is controlled by a control signal φSEL and outputs an output from the source follower amplifier 404 described above to the vertical output line.

Figure 5:
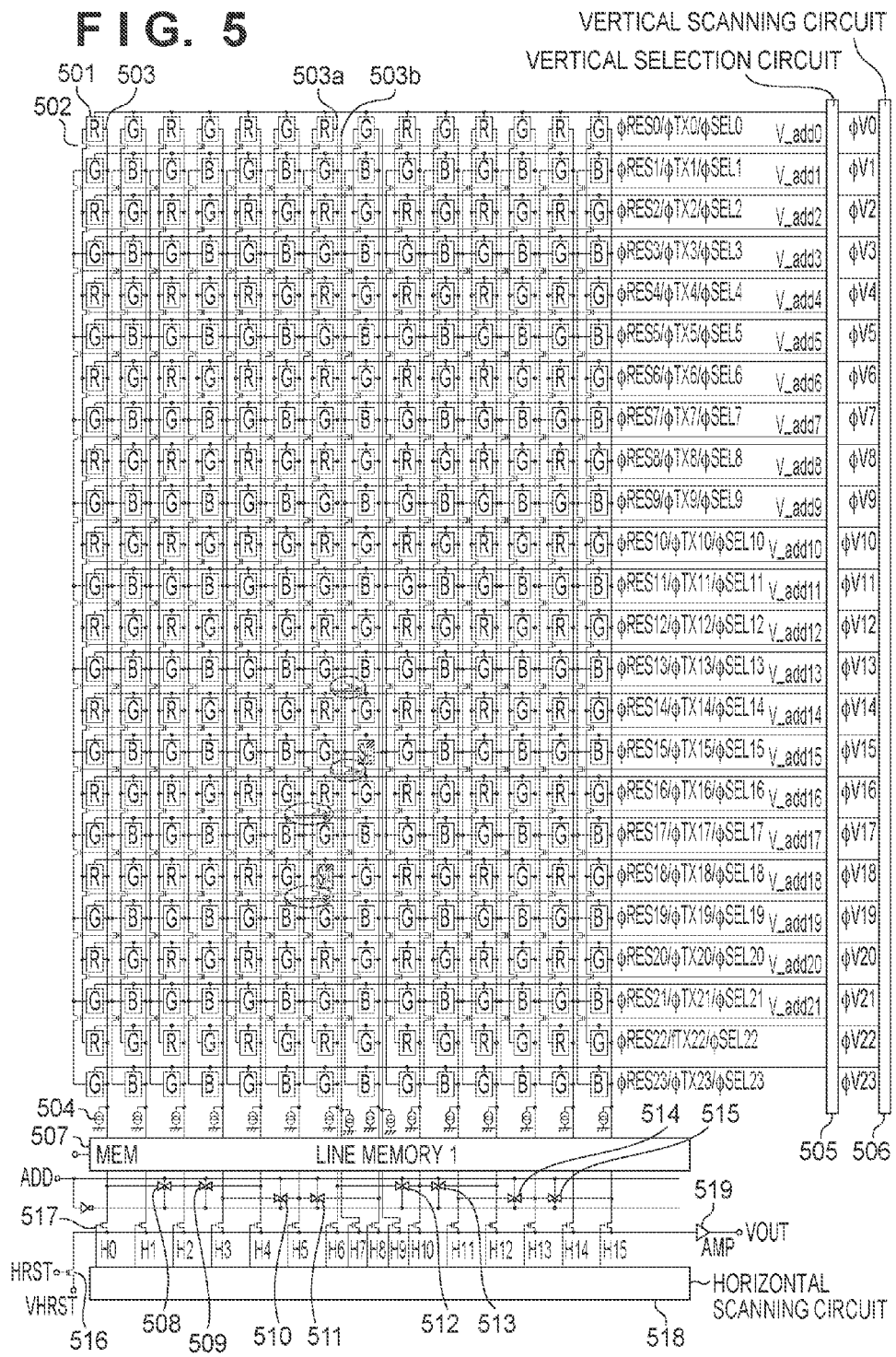
FIG. 5 is a block diagram of the overall image sensor according to the first embodiment.

FIG. 5 is a circuit block diagram of an overall CMOS image sensor used in this embodiment. Some actual products have several million pixels or more. In this case, for the sake of simplicity, an arrangement including 14×24 pixels will be described below.

Reference numeral 501 denotes a pixel portion which has the circuit arrangement shown in FIG. 4 and in which 14×24 pixels are arranged. As pixel coordinates, (X, Y)=(0, 0) to (13, 23) are assigned, with the upper left pixel being a reference. Color filters have a Bayer arrangement. R (Red), G (Green), and B (Blue) written in FIG. 5 indicate the colors of color filters which are coated on the photodiodes. The pixels SHA and SHB indicate the focus detecting pixels described with reference to FIGS. 3A and 3B. The pixel SHA is placed at the coordinates (6, 18), and the pixel SHB is placed at the coordinates (7, 15). The color filters for the focus detecting pixels are formed into G or transparent filters to allow focus detection. A plurality of pairs of pixels SHA and SHB are discretely arranged as focus detecting pixels on the image sensor to perform focus detection. However, for the sake of simplicity, an arrangement including only one pair will be described.

Reference numeral 502 denotes MOS transistors for adding pixel outputs in the vertical direction, which are commonly controlled for each row by 22 signal lines, namely signal lines V_add0 to V_add21. Consider an addition method regarding column 0 as a representative example. The apparatus properly turns on the MOS transistors 502 to connect (short-circuit), in parallel, the FD capacitors of pixels including three R pixels at (0, 0), (0, 2), and (0, 4), three G pixels at (0, 3), (0, 5), and (0, 7), three R pixels at (0, 6), (0, 8), and (0, 10), three G pixels at (0, 9), (0, 11), and (0, 12), three R pixels at (0, 12), (0, 14), and (0, 16), three G pixels at (0, 15), (0, 17), and (0, 19), and three R pixels at (0, 18), (0, 20), and (0, 22). The apparatus then performs addition by transferring the charges in the respective photodiodes to the FD capacitors connected in parallel. The same applies to the remaining columns. With the above arrangement, this apparatus performs addition processing three pixels at a time in the vertical direction.

In addition, the pixels SHA and SHB are focus detecting pixels, and hence addition of signals from them and those from image forming pixels will make it difficult to perform focus detection. For this reason, if targets for three-pixel addition include a focus detecting pixel, it is necessary to exclude the focus detecting pixel from the targets for vertical addition and make the focus detecting pixel output a signal by itself. When adding signals from the pixels at (6, 18), (6, 20), and (6, 22) including the pixel SHA at (6, 18), therefore, the gate potentials of the MOS transistors 502 for addition of the pixels at (6, 16) and (6, 18) are fixed to GND to always set the transistors in an OFF state regardless of the control signal. V_add. In addition, the MOS transistors 502 for addition of the image forming pixels at (6, 20) and (6, 22) are turned on to connect the FD capacitors in parallel and transfer charges in the respective photodiodes to the FD capacitors connected in parallel, thereby performing addition.

Likewise, when adding signals from the pixels at (7, 15), (7, 17), and (7, 19) as targets for addition, which include the pixel SHB at (7, 15), the apparatus fixes the gate potentials of the MOS transistors 502 for addition of the pixels (7, 13) and (7, 1.5) to GND to always set the transistors in an OFF state regardless of the control signal V_add. In addition, the apparatus turns on the MOS transistors 502 for addition of the image forming pixels at (7, 17) and (7, 19) to connect the FD capacitors in parallel and transfer charges in the respective photodiodes to the FD capacitors connected in parallel, thereby performing addition.

This makes it possible to exclude the focus detecting pixels from target pixels for vertical addition. In addition, it is possible to perform vertical addition of image forming pixels, in an addition group including focus detecting pixels, from which the focus detecting pixels are excluded.

Reference numeral 503 denotes vertical output lines shown in FIG. 4, which are arranged for the respective columns to output outputs from the source follower amplifiers 404. Two vertical output lines (first and second vertical output lines) 503a and 503b are arranged for the columns including the focus detecting pixels SHA and SHB. In the above vertical addition processing, these vertical output lines are arranged to separately output signals from image forming pixels which are added when they include focus detecting pixels and signals from the focus detecting pixels which are not added. Reference numeral 504 denote constant current sources for loads of the source follower amplifiers 404, which are arranged for the respective vertical output lines.

Reference numeral 505 denotes a vertical selection circuit for outputting the control signals φRES, φTX, φSEL, and V_add for the circuits of the pixel portion, which outputs the above control signals in accordance with row selection signals designated by a vertical scanning circuit 506.

Reference numeral 507 denotes a line memory, which temporarily stores vertically transferred pixel signals corresponding to one row in accordance with a control signal MEM, and for which capacitors for storing analog signals are arranged for the respective vertical output lines; and 508 to 515, analog switches for performing horizontal pixel addition, which perform horizontal pixel addition of pixel signals transferred to the analog memory in accordance with a control signal ADD. As in the case of vertical addition, connecting line memories in parallel with the analog switches will execute horizontal addition, thereby adding signals from three pixels on columns 0, 2, and 4, three pixels on columns 3, 5, and 8, three pixels on columns 6, 10, and 12, and three pixels on columns 11, 13, and 15, respectively. In this case, columns 7 and 9 of the line memory, on which signal outputs from the focus detecting pixels SHA and SHB are connected through the vertical output line 503b, are not connected to the remaining columns to be excluded from targets for horizontal addition.

Reference numeral 516 denotes a reset MOS transistor for resetting horizontal output lines; 517, MOS transistors for connecting outputs from the line memory to horizontal output lines, which are controlled by a horizontal scanning circuit (to be described later) to sequentially output pixel signals to the horizontal output lines; 518, a known horizontal scanning circuit; and 519, an amplifier for outputting pixel outputs from horizontal output lines to the outside.

Executing addition in the horizontal direction after vertical three-pixel addition with the above arrangement can obtain an addition output of nine image forming pixels when a target pair for horizontal/vertical addition includes no focus detecting pixels. In addition, when a target pair for horizontal/vertical addition includes a focus detecting pixel, it is possible to obtain an addition output of eight image forming pixels from which the focus detecting pixel is excluded and an output from the focus detecting pixel not to be added.

The image forming pixels are arranged to allow readout operation by switching among all pixel readout; operation, addition/thinning-out readout operation by vertical three-pixel addition and horizontal three-pixel addition, and addition/thinning-out readout operation by vertical five-pixel addition and horizontal three-pixel addition by using control signals (not shown) and changing horizontal and vertical scanning timings. Vertical five-pixel addition will be described later.

FIGS. 6A to 6I are views showing the relationships between pixel arrangements and addition readout operations in vertical three-pixel addition readout operation and horizontal three-pixel addition readout operation.

First of all, FIG. 6A shows the overall arrangement of 14×24 pixels. Referring to FIG. 6A, the image forming pixels indicated by the hatchings indicate the barycentric positions of added pixels after vertical addition and horizontal addition. The focus detecting pixels SHA and SHB are pixels from which signals are independently out put. FIGS. 6B, 6C, 6D, and 6E respectively show the relationships between the pixels of an RG column, the pixels of a GB column, the pixels of an RG column including the pixel SHA, and the pixels of a GB column including the pixel SHB, in addition readout operation. Since the relationships between the pixels before and after addition are obvious from FIGS. 6B to 6E, a description of them will be omitted.

Likewise, FIGS. 6F, 6G, 6H, and 6I show how addition readout operation is performed, respectively, on an RG row, a GB row, an RG row including the pixel SHA, and a GB row including the pixel. SHB. The unmarked pixels are not connected, and hence output signals are not handled as image signals and focus detecting signals. Since the relationships between the pixels before addition and after horizontal addition are obvious from FIGS. 6F to 6I, a description of them will be omitted.

In addition, signals output from the focus detecting pixels SHA and SHB are not added to signals output from the remaining pixels and can be independently output. At the same time, it is possible to add all signals output from the remaining image forming pixels, in each addition group including a focus detecting pixel, from which the focus detecting pixel is excluded. Addition phases and pixel arrangements are set to obtain outputs from more image forming pixels as image signals.

Figure 7B:
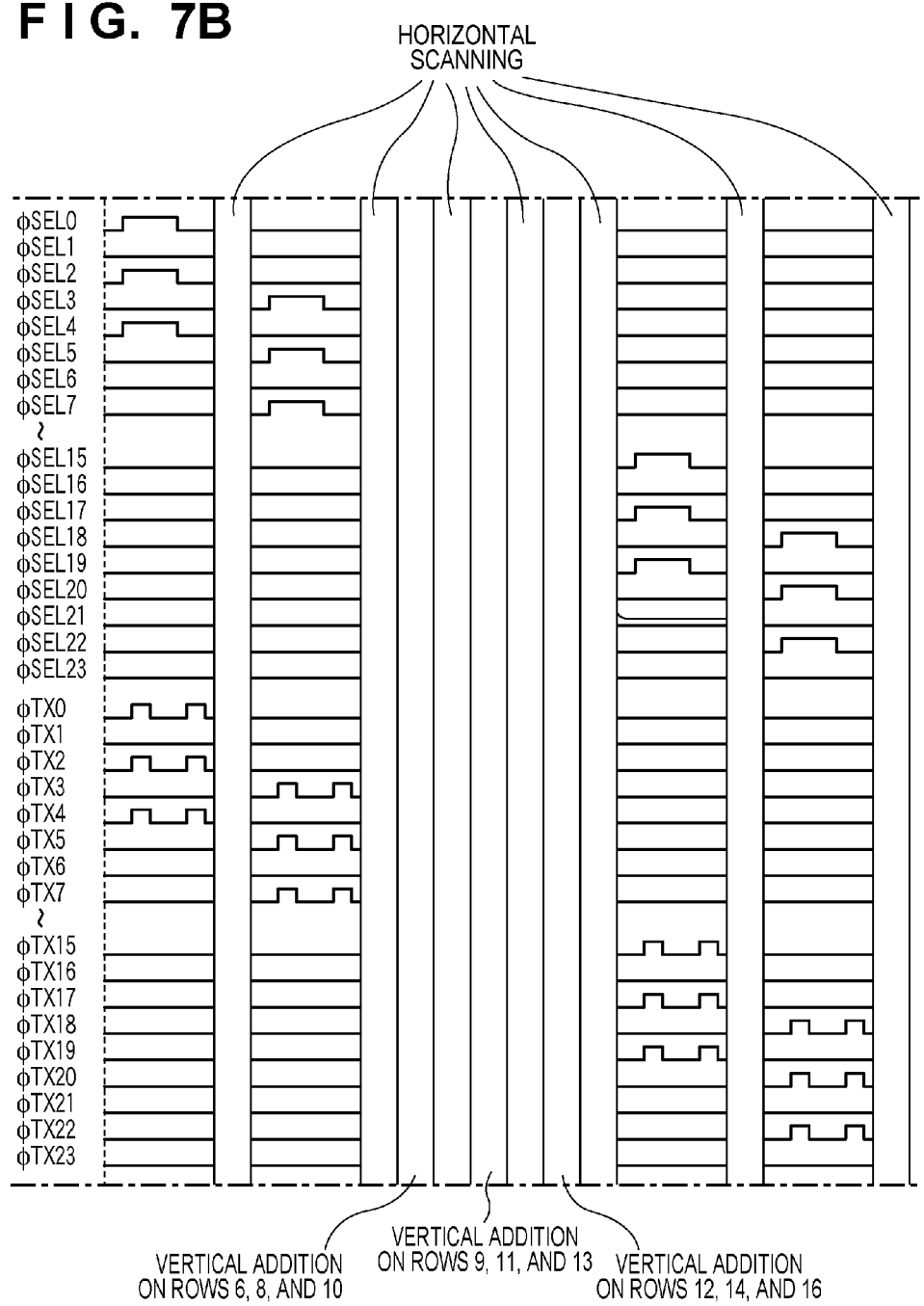

FIGS. 7A to 7C are views for explaining the readout operation of the image sensor in FIG. 5, showing the vertical scanning timing at the time of vertical three-pixel addition readout operation. A description of all pixel readout operation will be omitted.

First of all, the apparatus outputs a vertical scanning signal. φV0, and sets signals φRES0, φRES2, and φRES4 to L level to turn off the reset MOS transistors on rows 0, 2, and 4. At this time, the apparatus outputs signals φSEL0, φSEL2, and φSEL4 to turn on the pixel selection MOS transistors on rows 0, 2, and 4. In this state, the apparatus sets signals V_add0 and V_add2 to H level to connect the FD capacitors on rows 0, 2, and 4 in parallel, and turns on charge-transfer MOS transistors to transfer the charges in the photodiodes on rows 0, 2, and 4 to the FD capacitors connected in parallel by using signals φTX0, φTX2, and φTX4. After the transfer, the apparatus restores the signals φTX and V_add to L level. Thereafter, the apparatus sets a signal MEM to H level to perform vertical transfer of pixel signals after three-pixel addition to the line memory.

Upon completion of the vertical transfer, the apparatus restores the signal φRES to H level, and sets the signals φTX0, φTX2, and φTX4 to H level to reset the photodiodes and the FD capacitors. After resetting, the apparatus restores the signal. φTX to L level again to start storing charges in the photodiodes on rows 0, 2, and 4. After vertical transfer, the apparatus performs horizontal scanning, and then completes readout operation on rows 0, 2, and 4.

Subsequently, the apparatus sequentially performs vertical transfer and horizontal scanning on rows 3, 5, and 7, vertical transfer and horizontal scanning on rows 6, 8, and 10, vertical transfer and horizontal scanning on rows 9, 11, and 13, vertical transfer and horizontal scanning on rows 12, 14, and 16, and vertical transfer and horizontal scanning on rows 15, 17, and 19. Finally, the apparatus performs vertical transfer and horizontal scanning on rows 18, 20, and 22 to complete addition/chinning-out readout operation by vertical three-pixel addition and horizontal three-pixel addition. The timing in this operation is obvious from FIGS. 7A to 7C, and hence a detailed description of it will be omitted. In addition, signals from the pixels SHB and SHA arranged on the 15th and 18th rows are not added and output because the addition MOS transistors are always set in an OFF state, and are independently output. Horizontal scanning will be described in detail later.

Figure 8:
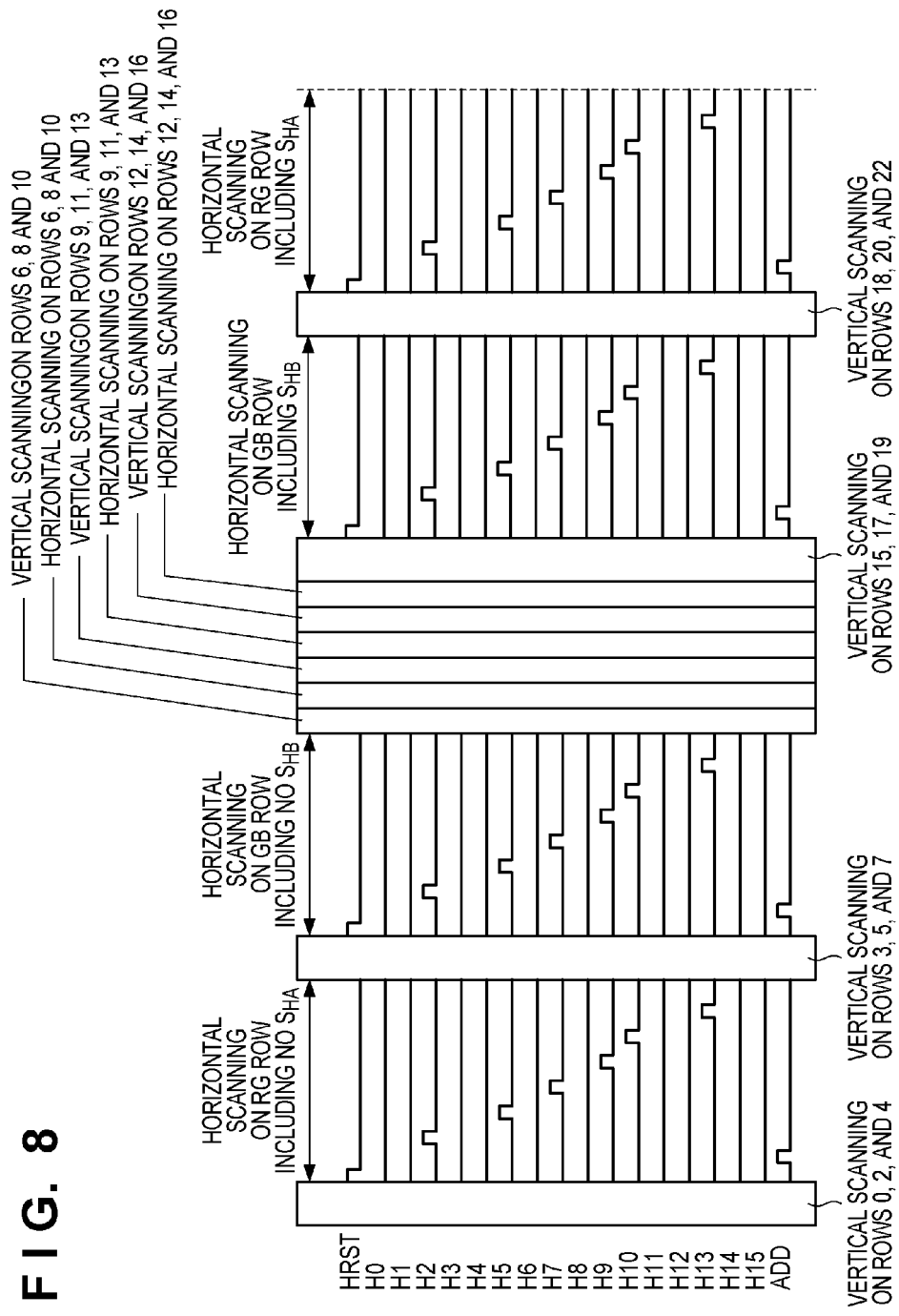
FIG. 8 is a timing chart of the horizontal transfer of the image sensor according to the first embodiment.

FIG. 8 is a view for explaining the readout operation of the image sensor in FIG. 5, showing the horizontal scanning timing at the time of horizontal three-pixel addition readout operation. A description of all pixel readout operation will be omitted. First of all, when outputting the pixel signals on rows 0, 2, and 4, which have undergone vertical transfer, to the external terminal of the image sensor by horizontal scanning, the apparatus outputs a signal HRST to reset a horizontal transfer line to a predetermined potential VHRST. The apparatus then controls horizontal addition signal ADD=H level to connect the line memories in parallel to execute horizontal addition of the three pixels on columns 0, 2, and 4, the three pixels on columns 3, 5, and 8, the three pixels on columns 6, 10, and 12, and the three pixels on columns 11, 13, and 15. Columns 7 and 9 include no pixels which are connected, and hence output signals are not handled as image signals and focus detecting signals. Subsequently, the horizontal scanning circuit sequentially outputs horizontal scanning signals like H2→H5→H7→H9→H10→H13 to sequentially turn on the MOS transistors 517 to output signals from columns 2, 5, 7, 9, 10, and 13 of the line memory to the outside via the amplifier 519.

Likewise, the apparatus sequentially repeats vertical transfer and horizontal scanning on rows 3, 5, and 7, vertical transfer and horizontal scanning on rows 6, 8, and 10, vertical transfer and horizontal scanning on rows 9, 11, and 13, vertical transfer and horizontal scanning on rows 12, 14, and 16, vertical transfer and horizontal scanning on rows 15, 17, and 19, and vertical transfer and horizontal scanning on rows 18, 20, and 22. Detailed timings are obvious from FIG. 8, and hence a description of them will be omitted. Since the vertical addition signals from rows 15, 17, and 19 and rows 18, 20, and 22 respectively include signals from the pixels SHA and SHB, they are excluded from targets for horizontal addition and are independently output from columns 7 and 9 which are not connected to the remaining columns to allow to output them without addition.

This embodiment can change the number of pixels in the vertical direction. Control to be performed in vertical five-pixel addition readout operation will be described next. FIGS. 9A to 9I are views showing the relationships between pixel arrangements and addition readout operations when the image sensor in FIG. 5 performs vertical five-pixel addition readout operation and horizontal three-pixel addition readout operation.

Figure 9A:
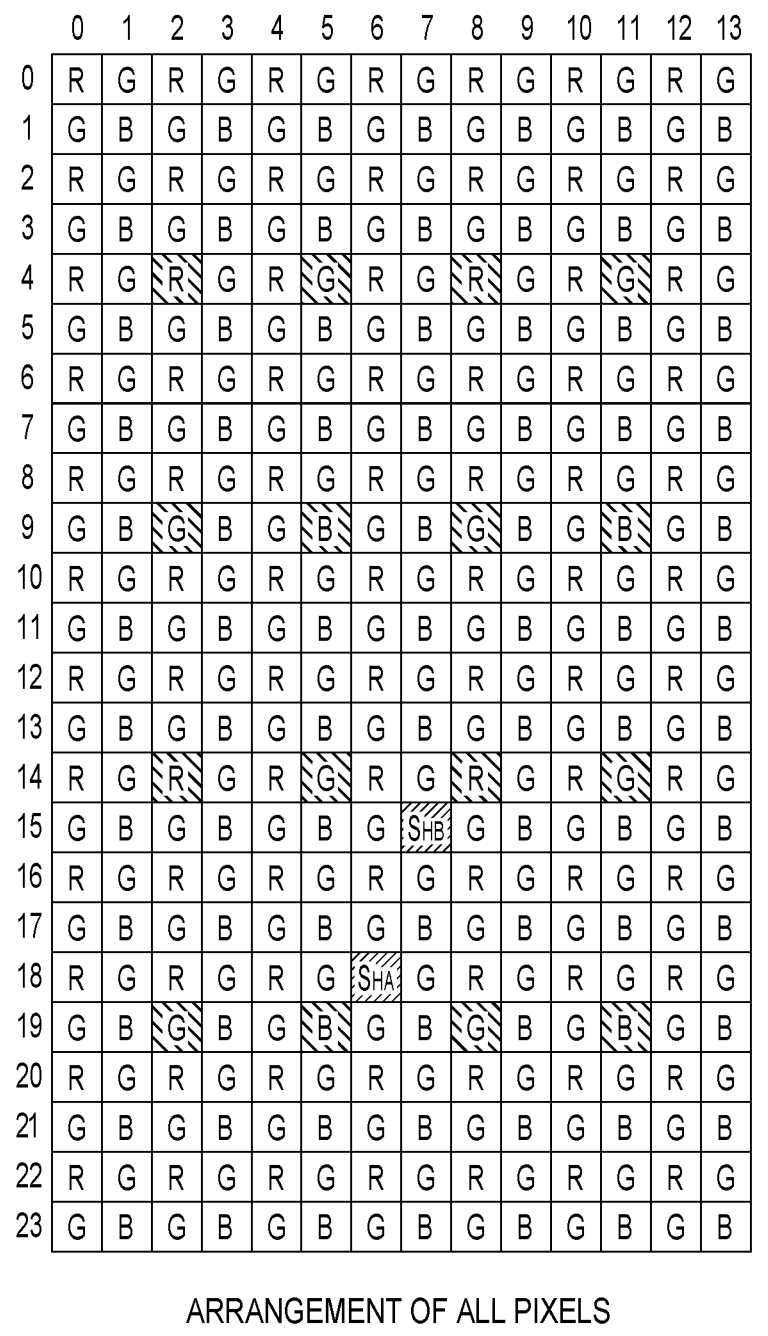

First of all, FIG. 9A shows the overall arrangement of 14×24 pixels. Referring to FIG. 9A, the image forming pixels indicated by the hatchings indicate the barycentric positions of added pixels after vertical addition and horizontal addition. The focus detecting pixels SHA and SHB are pixels from which signals are independently output. FIGS. 9B, 9C, 9D, and 9E respectively show the relationships between the pixels of an RG column, the pixels of a GB column, the pixels of an RG column including the pixel SHA, and the pixels of a GB column including the pixel SHB, in addition readout operation. Since the relationships between the pixels before and after addition are obvious from FIGS. 9B to 9E, a description of them will be omitted.

Likewise, FIGS. 9F, 9G, 9H, and 9I show how readout is performed, respectively, on an RG row, a GB row, an RG row including the pixel SHA, and a GB row including the pixel SHB. The unmarked pixels are not connected, and hence output signals are not handled as image signals and focus detecting signals. Since the relationships between the pixels before addition and after horizontal addition are obvious from FIGS. 9F to 9I, a description of them will be omitted.

In addition, signals output from the focus detecting pixels SHA and SHB are not added to signals output from the remaining pixels and can be independently output at the time of vertical five-pixel addition as well as at the time of vertical three-pixel addition shown in FIGS. 6D and 6E. At the same time, it is possible to add all signals output from the remaining image forming pixels, in each addition group including a focus detecting pixel, from which the focus detecting pixel is excluded. Addition phases and pixel arrangements are set to obtain outputs from more image forming pixels as image signals. That is, pixel arrangements are set in accordance with addition phases such that the focus detecting pixels in addition groups in vertical three-pixel addition and vertical five-pixel addition are located at the ends of the addition groups in the respective addition modes.

FIG. 10 is a view for explaining the readout operation of the image sensor in FIG. 5, showing the vertical scanning timing at the time of vertical five-pixel addition readout operation. A description of all pixel readout operation will be omitted.

First of all, the apparatus outputs a vertical scanning signal φV0, and sets signals φRES0, φRES2, φRES4, φRES6, and φRES8, to L level to turn off the reset MOS transistors on rows 0, 2, 4, 6, and 8. At this time, the apparatus outputs φSEL0, φSEL2, φSEL4, φSEL6, and φSEL8 to turn on the pixel selection MOS transistors on rows 0, 2, 4, 6, and 8. In this state, the apparatus sets signals V_add0, V_add2, V_add4, and V_add6 to H level to connect the FD capacitors on rows 0, 2, 4, 6, and 8 in parallel, and turns on charge-transfer MOS transistors by using signals φTX0, φTX2, φTX4, φTX6, and φTX8 to transfer the charges in the photodiodes on rows 0, 2, 4, 6, and 8 to the FD capacitors connected in parallel. After the transfer, the apparatus restores the signals φTX and V_add to L level. Thereafter, the apparatus sets a signal MEM to H level to perform vertical transfer of pixel signals after five-pixel addition to the line memory.

Upon completion of the vertical transfer, the apparatus restores the signal φRES to H level, and sets the signals φTX0, φTX2, φTX4, φTX6, and φTX8 to H level to reset the photodiodes and the FD capacitors. After resetting, the apparatus restores the signal φTX to L level again to start storing charges in the photodiodes on rows 0, 2, 4, 6, and 8. After vertical transfer, the apparatus performs horizontal scanning, and then completes readout operation on rows 0, 2, 4, 6, and 8.

Subsequently, the apparatus sequentially performs vertical transfer and horizontal scanning on rows 5, 7, 9, 11, and 13, and vertical transfer and horizontal scanning on rows 10, 12, 14, 16, and 18, and finally performs vertical transfer and horizontal scanning on rows 15, 17, 19, 21, and 23 to complete addition/thinning-out readout operation by vertical five-pixel addition and horizontal three-pixel addition. The timing in this operation is obvious from FIG. 10, and hence a detailed description of it will be omitted. In addition, signals from the pixels SHB and SHA arranged on the 15th and 18th rows are not added and output because the addition MOS transistors are always set in an OFF state, and are independently output. The details of horizontal scanning are the same as those in vertical three-pixel addition operation, and hence a description of it will be omitted.

As described above, at the time of vertical addition, matching the addition phases of different vertical addition cycles with the arrangement of focus detecting pixels can add outputs from all the image forming pixels except for the focus detecting pixels, when addition groups include the focus detecting pixels, without adding outputs from the focus detecting pixels.

In addition, always setting the addition MOS transistors for adding outputs from the focus detecting pixels in an OFF state can keep the opening portions of pixels wide without requiring to increase new control signals for setting the focus detecting pixels in a non-addition state.

Furthermore, providing two vertical output lines for the columns including the focus detecting pixels can simultaneously obtain added outputs from the image forming pixels and non-added outputs from the focus detecting pixels. This can implement fast readout operation and hence can cope with higher frame rates and implement highly responsive focus detection and AF by using outputs from the focus detecting pixels in the non-addition state.

Moreover, since it is possible to obtain, as image signals, addition signals from all the image forming pixels arranged around the focus detecting pixels, it is possible to obtain image signals with higher image quality without performing interpolation processing for defective pixels.

Figure 11:
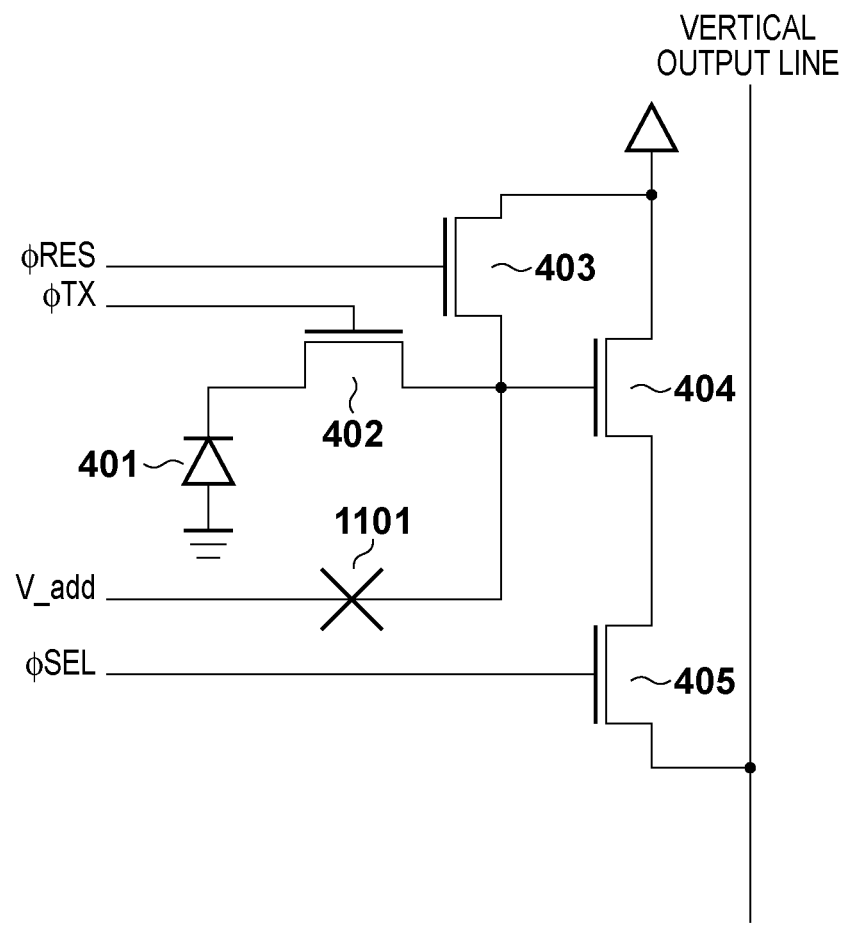
FIG. 11 is a circuit diagram of a pixel portion of a modification of the image sensor according to the first embodiment.

FIG. 11 shows a modification for setting focus detecting pixels in a non-addition state. The same reference numerals as those of the circuit of the pixel portion in FIG. 4 denote the same components in FIG. 11. Cutting the addition signal line V_add for a pixel to be set in a non-addition state as indicated by reference numeral 1101 in FIG. 11 can obtain the same effect as that in FIG. 5.

Second Embodiment

Figure 12:
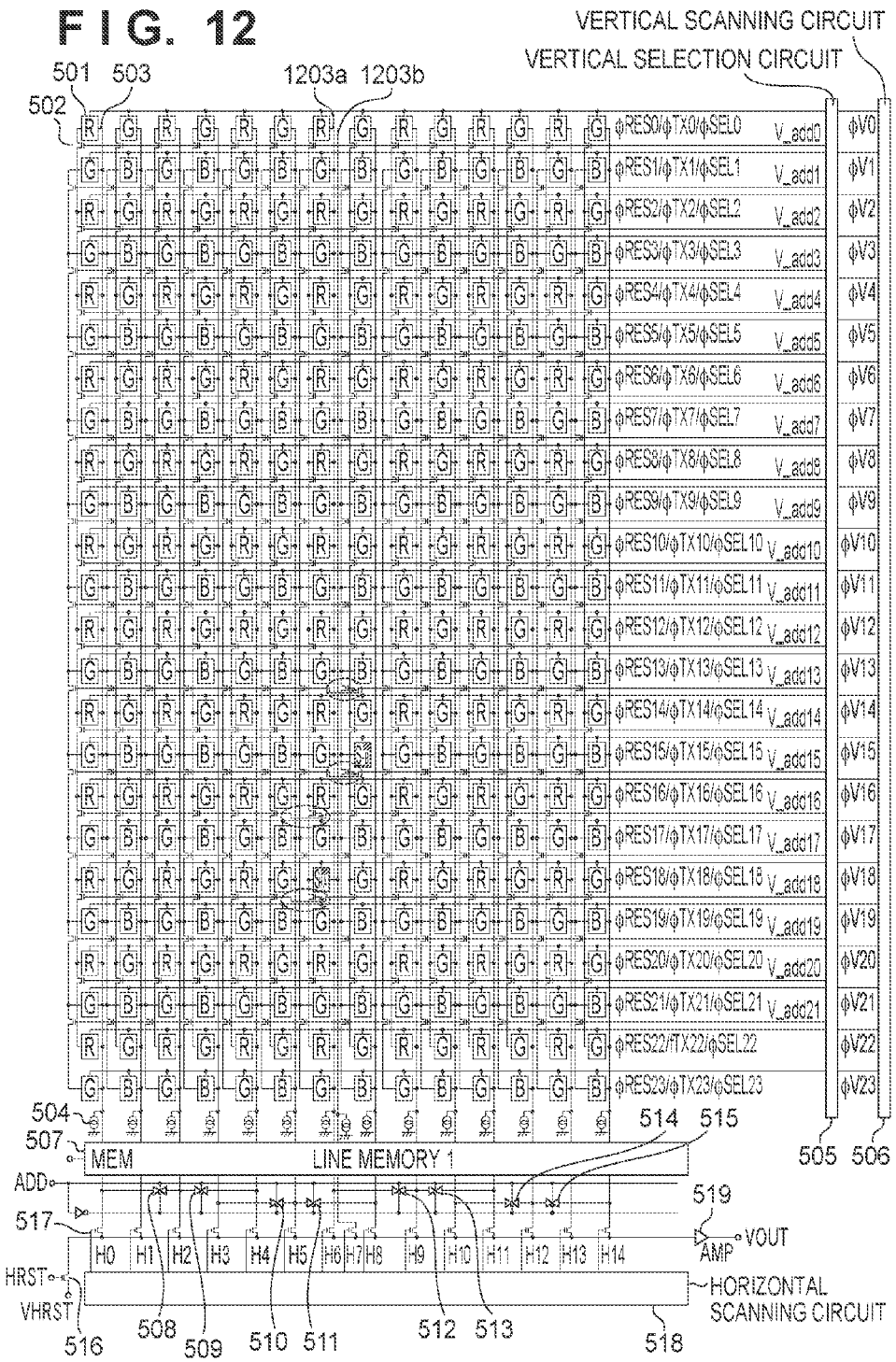
FIG. 12 is a block diagram of an overall image sensor according to the second embodiment.

FIG. 12 is a block diagram showing the overall circuit of a CMOS image sensor according to the second embodiment of the present invention. The same reference numerals as in the first embodiment in FIG. 5 denote components having the same functions in FIG. 12. In addition, the number of pixels and the pixel arrangements of image forming pixels and focus detecting pixels are the same as those in the first embodiment.

Referring to FIG. 12, reference numerals 1203a and 1203b denote vertical output lines each identical to that shown in FIG. 4, which are placed between columns on which focus detecting pixels SHA and SHB are adjacent to each other, and are connected so as to output signals from the focus detecting pixels in a non-addition state when the focus detecting pixels are included in vertical addition processing. That is, allowing to output signal outputs from the pixels SHA and SHB using the common vertical output lines, thereby achieving a reduction in circuit size.

FIGS. 13A to 13I are views showing the relationships between pixel arrangements and addition readout operations in vertical three-pixel addition readout operation and horizontal three-pixel readout operation in this embodiment.

Figure 13A:
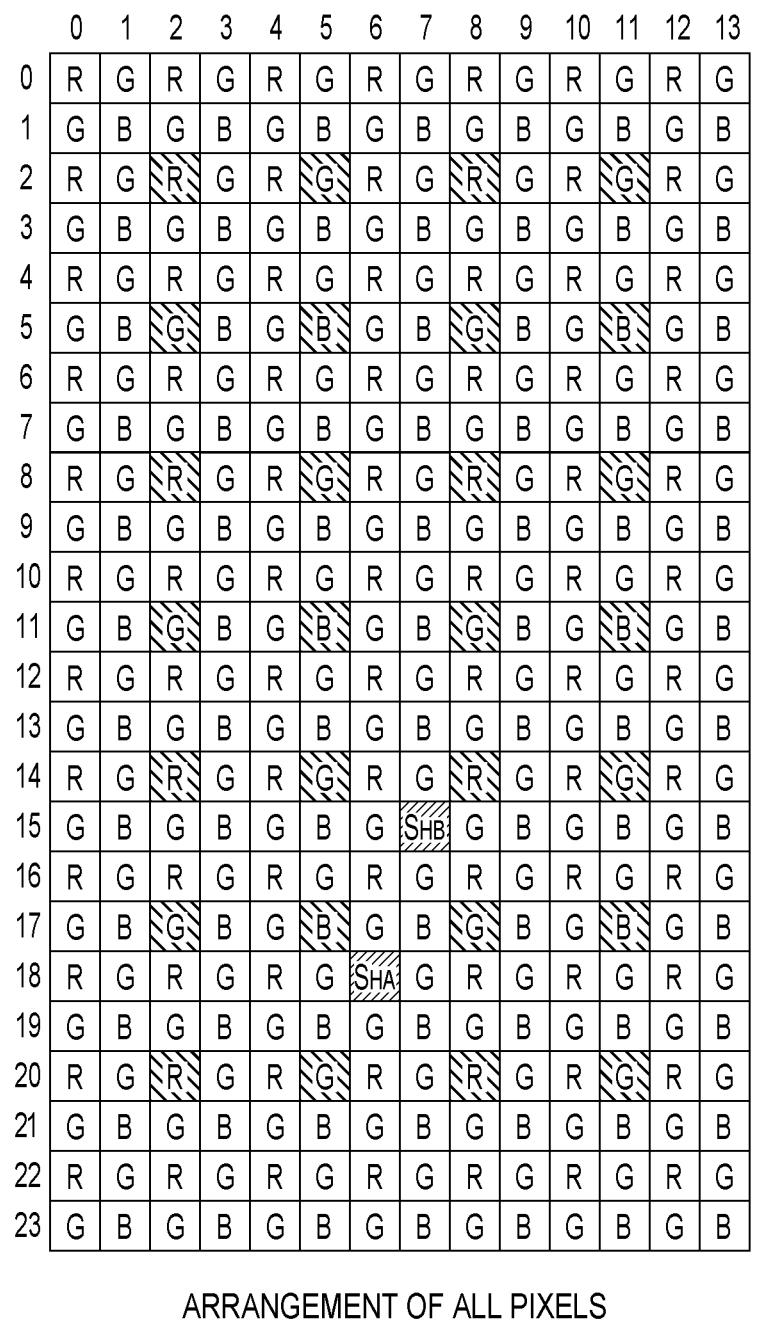

First of all, FIG. 13A shows the overall arrangement of 14×24 pixels. Referring to FIG. 13A, the image forming pixels indicated by the hatchings indicate the barycentric positions of added pixels after vertical addition and horizontal addition. Focus detecting pixels SHA and SHB are pixels from which signals are independently output. FIGS. 13B, 13C, 13D, and 13E respectively show the relationships between the pixels of an RG column, the pixels of a GB column, the pixels of an RG column including the pixel SHA, and the pixels of a GB column including the pixel SHB, in addition readout operation. Since the relationships between the pixels before and after addition are obvious from FIGS. 13B to 13E, a description of them will be omitted.

Likewise, FIGS. 13F, 13G, 13H, and 13I show how addition readout is performed, respectively, on an RG row, a GB row, an RG row including the pixel SHA, and a GB row including the pixel SHB. The unmarked pixels are not connected, and hence output signals are not handled as image signals and focus detecting signals. Since the relationships between the pixels before addition and after horizontal addition are obvious from FIGS. 13F to 13I, a description of them will be omitted.

In addition, the focus detecting pixels SHA and SHB are connected to the same vertical output lines, and hence signals are output from them to the same position on the line memory. In addition, these signals are not added to signals output from the remaining pixels and can be independently output. At the same time, it is possible to add all signals output from the remaining image forming pixels, in each addition group including a focus detecting pixel, from which the focus detecting pixel is excluded. Addition phases and pixel arrangements are set to obtain outputs from more image forming pixels as image signals. Note that the vertical scanning timing at the time of vertical pixel addition readout operation is the same as that in the first embodiment, and hence a description of the operation will be omitted.

FIG. 14 is a view for explaining the readout operation of the image sensor in FIG. 12, showing the horizontal scanning timing at the time of horizontal three-pixel addition readout operation. A description of all pixel readout operation will be omitted. First of all, when outputting the pixel signals on rows 0, 2, and 4, which have undergone vertical transfer, to the external terminal of the image sensor by horizontal scanning, the apparatus outputs a signal HRST to reset the horizontal transfer line to a predetermined potential VHRST. The apparatus then controls horizontal addition signal ADD=H level to connect the line memories in parallel to execute horizontal addition of the three pixels on columns 0, 2, and 4, the three pixels on columns 3, 5, and 8, the three pixels on columns 6, 9, and 11, and the three pixels on columns 10, 12, and 14, thereby executing horizontal addition. Column 7 includes no pixels which are connected, and hence output signals are not handled as image signals and focus detecting signals. Subsequently, the apparatus sequentially outputs horizontal scanning signals like H2→H5→H7→H9→H12 to sequentially turn on MOS transistors 517 to output signals from columns 2, 5, 7, 9, and 12 of the line memory to the outside via an amplifier 519.

Likewise, the apparatus sequentially repeats vertical transfer and horizontal scanning on rows 3, 5, and 7, vertical transfer and horizontal scanning on rows 6, 8, and 10, vertical transfer and horizontal scanning on rows 9, 11, and 13, vertical transfer and horizontal scanning on rows 12, 14, and 16, vertical transfer and horizontal scanning on rows 15, 17, and 19, and vertical transfer and horizontal scanning on rows 18, 20, and 22. Since the detailed timing is obvious from FIG. 14, a description of it will be omitted. Since the vertical, addition signals from rows 15, 17, and 19 and rows 18, 20, and 22 respectively include signals from the pixels SHA and SHB, they are excluded from targets for horizontal addition and are independently output from column 7 which is not connected to the remaining columns to allow to output them without addition.

As described above, when focus detecting pixels are continuously arranged on adjacent columns, it is possible to use a vertical output line for both the pixels. This makes it possible to reduce the circuit size as compared with the first embodiment. In addition, this embodiment can obtain the same effects as those of the first embodiment in terms of readout speed and image quality.

Third Embodiment

Figure 15:
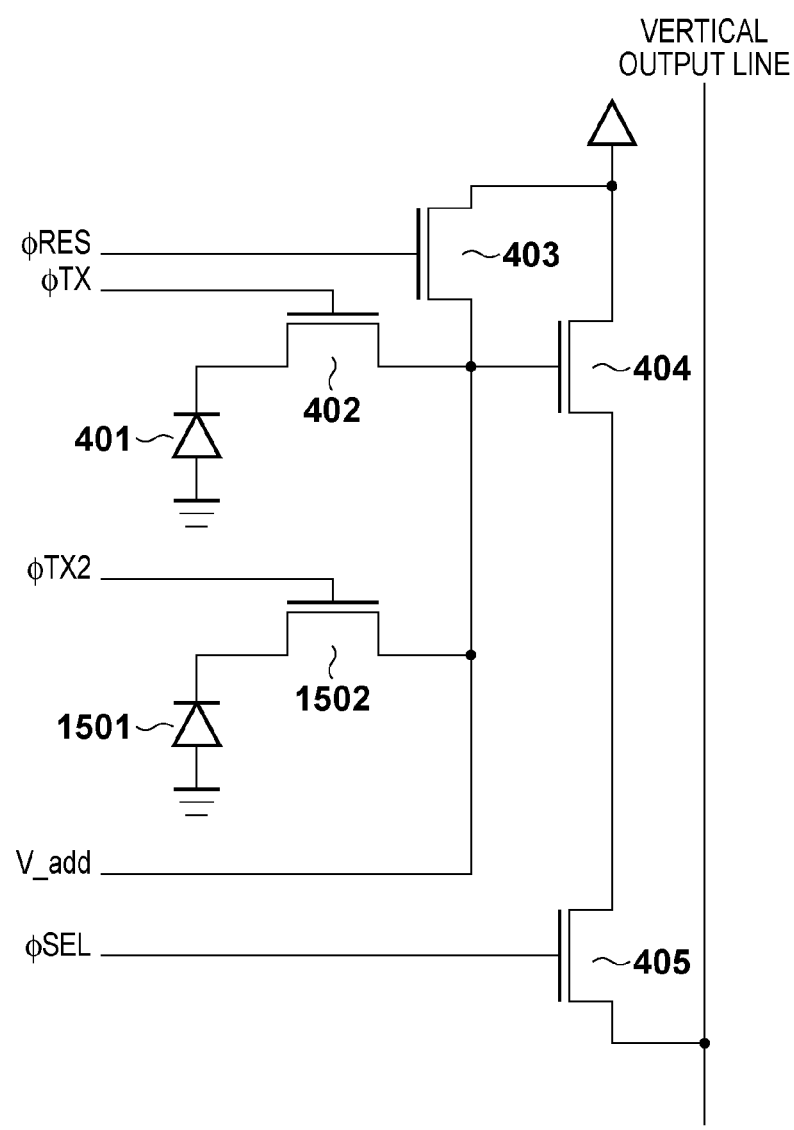
FIG. 15 is a circuit diagram of a pixel portion of an image sensor according to the third embodiment.

FIG. 15 is a circuit diagram of a pixel portion of an image sensor according to the third embodiment of the present invention. The same reference numerals as in the first embodiment in FIG. 4 denote components having the same functions in FIG. 15. In general, an image sensor using a CMOS performs vertical transfer for each row, and hence different transfer timings are set for different rows. This allows to share elements other than transfer MOS transistors in order to increase the opening portions of pixels. FIG. 15 shows a case in which two pixels share elements other than a transfer MOS transistor. Reference numeral 1501 denotes a photodiode; and 1502, a transfer MOS transistor of the photodiode 1501. The transfer MOS transistor 1502 transfers the charge in the photodiode 1501 to an FD capacitor 404. A pixel selection MOS 405 selects the transfer MOS transistor 1502 to perform vertical transfer.

Figure 16:
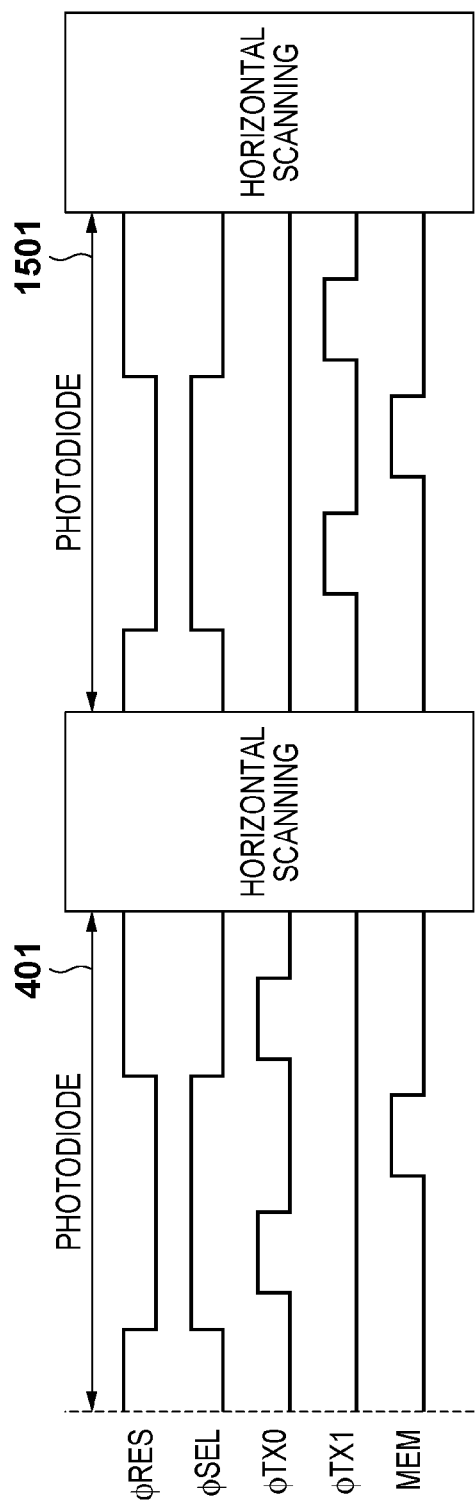
FIG. 16 is a timing chart of the driving operation of a pixel portion of the image sensor according to the third embodiment.

FIG. 16 is a timing chart of vertical transfer when two pixels share elements. An illustration concerning a vertical scanning signal will be omitted. First of all, the apparatus sets a signal φRES to L level to turn off the reset MOS transistor. At this time, the apparatus outputs a signal φSEL to turn on the pixel selection MOS transistor. The apparatus then turns on the charge-transfer MOS transistor by using a signal. φTX1 to transfer the charge in a photodiode 401 to the FD capacitor. Upon completion of the transfer, the apparatus restores the signal φTX1 to L level. Thereafter, the apparatus sets a signal MEM to H level to vertically transfer the pixel signal to the line memory. Upon completion of the vertical transfer, the apparatus restores the signal φRES to H level, and sets a signal φTX0 to H level to reset the photodiode 401 and the FD capacitor. With this operation, the apparatus completes the vertical transfer of the photodiode 401, and executes horizontal transfer.

The apparatus sets the signal φRES to L level again to turn off the reset MOS transistor. At this time, the apparatus outputs the signal φSEL to turn on the pixel selection MOS transistor. The apparatus then turns on the charge-transfer MOS transistor by using the signal φTX1 to transfer the charge in the photodiode 1501 to the FD capacitor. Upon completion of the transfer, the apparatus restores a signal φTX2 to L level. Thereafter, the apparatus sets the signal MEM to H level to vertically transfer the pixel signal to the line memory. Upon completion of the vertical transfer, the apparatus restores the signal. φRES to H level, and sets the signal φTX2 to H level again to reset the photodiode 1501 and the FD capacitor. With this operation, the apparatus completes the vertical transfer of the photodiode 1501, and executes horizontal transfer.

As described above, since the photodiodes 401 and 1501 have different vertical transfer timings, providing two types of charge-transfer MOS transistors allows to share other elements.

Figure 17:
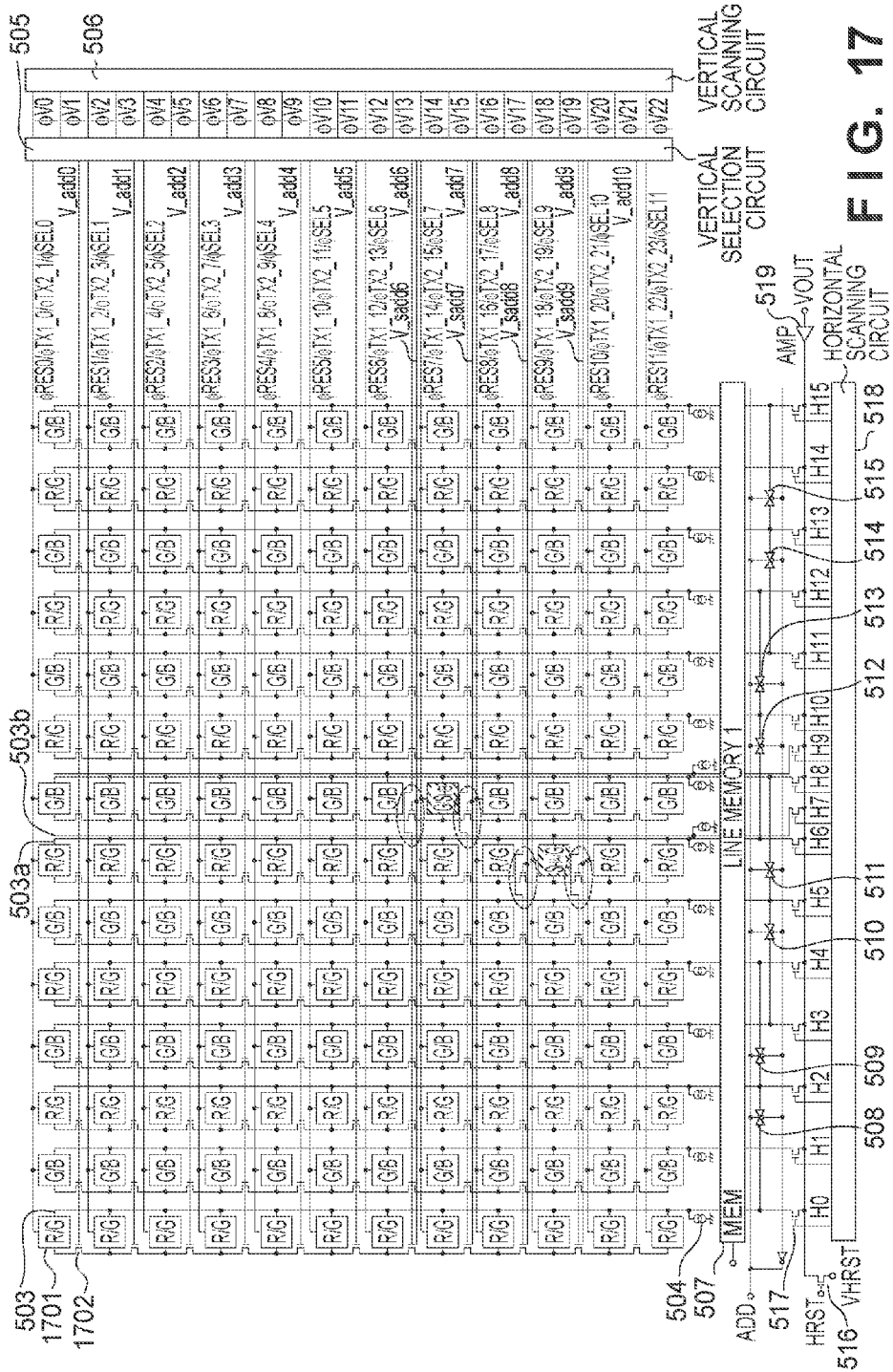
FIG. 17 is a block diagram of the overall image sensor according to the third embodiment.

FIG. 17 is a circuit block diagram of an overall CMOS image sensor used in the third embodiment. Some actual products have several million pixels or more. In this case, for the sake of simplicity, an arrangement including 14×24 pixels will be described below. The same reference numerals as in FIG. 5 denote components having the same functions in FIG. 17, and a description of them will be omitted.

Reference numeral 1701 denotes a pixel portion which has the circuit arrangement shown in FIG. 15 and in which 14×24 pixels are arranged. As pixel coordinates, (X,Y)=(0, 0) to (13, 23) are assigned, with the upper left pixel being a reference. Color filters have a Bayer arrangement. R (Red), G (Green), and B (Blue) written in FIG. 17 indicate the colors of color filters which are coated on the photodiodes. The pixel arrangement is almost the same as that shown in FIGS. 4 and 5. Referring to FIG. 17, symbols R/G, G/B, SHA/G, and G/SHB each indicate a pixel portion circuit common to two pixels which is shown in FIG. 15. The details of the pixel arrangement will be described later.

The two hatched portions in FIG. 17 indicate that the focus detecting pixels SHA and SHB described with reference to FIGS. 3A and 3B each are paired with a general pixel and included in pixels including two identical pixels. In addition, a plurality of pairs of pixels SHA and SHB are discretely arranged as focus detecting pixels on the image sensor to perform focus detection. However, for the sake of simplicity, an arrangement including one pair will be described.

Reference numeral 1702 denotes MOS transistors for adding pixel outputs in the vertical direction, which are commonly controlled for each row by 11 signal lines, namely signal lines V_add0 to V_add10. Consider an addition method regarding column 0 as a representative example. The apparatus properly turns on MOS transistors 1702 to connect, in parallel, the FD capacitors of pixels including three R pixels at (0, 0), (0, 2), and (0, 4), three G pixels at (0, 3), (0, 5), and (0, 7), three R pixels at (0, 6), (0, 8), and (0, 10), three G pixels at (0, 9), (0, 11), and (0, 13), three R pixels at (0, 12), (0, 1.4), and (0, 16), three G pixels at (0, 15), (0, 17), and (0, 19), and three R pixels at (0, 18), (0, 20), and (0, 22). The apparatus then performs addition by transferring the charges in the respective photodiodes to the FD capacitors connected in parallel. The same applies to the remaining columns. With the above arrangement, this apparatus performs addition processing three pixels at a time in the vertical direction.

In addition, the pixels SHA and SHB are focus detecting pixels, and hence addition of pixel signals from them and those from image forming pixels will make it difficult to perform focus detection. For this reason, if targets for three-pixel addition include focus detecting pixels, it is necessary to independently output signals from the focus detecting pixels without executing vertical addition. The addition MOS transistors in the encircled portions in FIG. 17 are connected to V_sadd6, V_sadd7, V_sadd8, and V_sadd9, and can be individually switched between an ON state and an OFF state regardless of a control signal V_add as in the case shown in FIG. 5.

FIGS. 18A to 18M are views showing the relationships between pixel arrangements and addition readout operations including vertical three-pixel addition readout operation and horizontal three-pixel addition readout operation according to the third embodiment.

First of all, FIG. 18A shows the overall arrangement of 14×24 pixels. Referring to FIG. 18A, the image forming pixels indicated by the hatchings indicate the barycentric positions of added pixels after vertical addition and horizontal addition. The focus detecting pixels SHA and SHB are pixels from which signals are independently output. FIGS. 18B, 18C, 18D, 18E, 18F, and 18G respectively show the relationships between the pixels in R pixel addition on an RG column, the pixels in G pixel addition on an RG column, the pixels in R pixel addition on an RG column including the pixel SHA, and the pixels in G pixel addition on a GB column, the pixels in B pixel addition on a GB column, and the pixels in B pixel addition on a BG column including the pixel SHB.

FIG. 18B will be described first. The switches in FIG. 183 show the states of the addition MOS transistors 1702 in FIG. 17 when signals from P pixels are to be added. Setting the addition MOS transistors in the state shown in FIG. 18B will add signals from the three R pixels on rows 0, 2, and 4, the three P pixels on rows 6, 8, and 10, the three F pixels on rows 12, 14, and 16, and the three R pixels on rows 18, 20, and 22 in the vertical direction.

Likewise, setting the addition MOS transistors in the state shown in FIG. 18C will add signals from the three G pixels on rows 3, 5, and 7, the three G pixels on rows 9, 11, and 13, and the three G pixels on rows 15, 17, and 19 in the vertical direction.

In addition, with regard to a column including a focus detecting pixel, setting the addition MOS transistors in the state shown in FIG. 18D will add signals from the three R pixels on rows 0, 2, and 4, the three R pixels on rows 6, 8, and 10, and the three R pixels on rows 12, 14, and 16, independently output a signal from the pixel SHA on row 18, and add signals from the R pixels on rows 20 and 22. In the third embodiment as well, in order to independently output a signal from a focus detecting pixel, the corresponding addition switch is properly set so as not to add the signal from the focus detecting pixel. That is, when reading out a signal from a focus detecting pixel, the apparatus turns off corresponding V_sadd to independently read out an output from the focus detecting pixel. When reading out a signal from a pixel formed to share a circuit portion with a focus detecting pixel, the apparatus performs control to turn on corresponding V_sadd so as to perform pixel addition.

FIGS. 18E, 18F, and 18G show the states of the addition switches associated with GB columns. The idea of this operation is the same as that associated with RG columns, and hence a description of it will be omitted.

Likewise, FIGS. 18H, 18I, 18J, 18K, 18L, and 18M show how addition readout operation is performed, respectively, on an RG row, a GB row, an RG row including the pixel SHA, a GB row including the pixel SHB, a GB row including a pixel partly sharing a circuit with the pixel SHA, and an RG row including a pixel partly sharing a circuit with the pixel SHB. The apparatus does not handle signals from the unmarked pixels and the shaded G pixels as image signals and focus detecting signals. Since the relationships between the pixels before addition and after horizontal addition are obvious from FIGS. 18H to 18M, a description of them will be omitted.

In addition, it is possible to independently output signals from the focus detecting pixels SHA and SHB without adding them to signals from the remaining pixels. At the same time, it is possible to add all signals output from the remaining image forming pixels, in each addition group including a focus detecting pixel, from which the focus detecting pixel is excluded. Addition phases and pixel arrangements are set to obtain outputs from more image forming pixels as image signals.

Figure 19A:
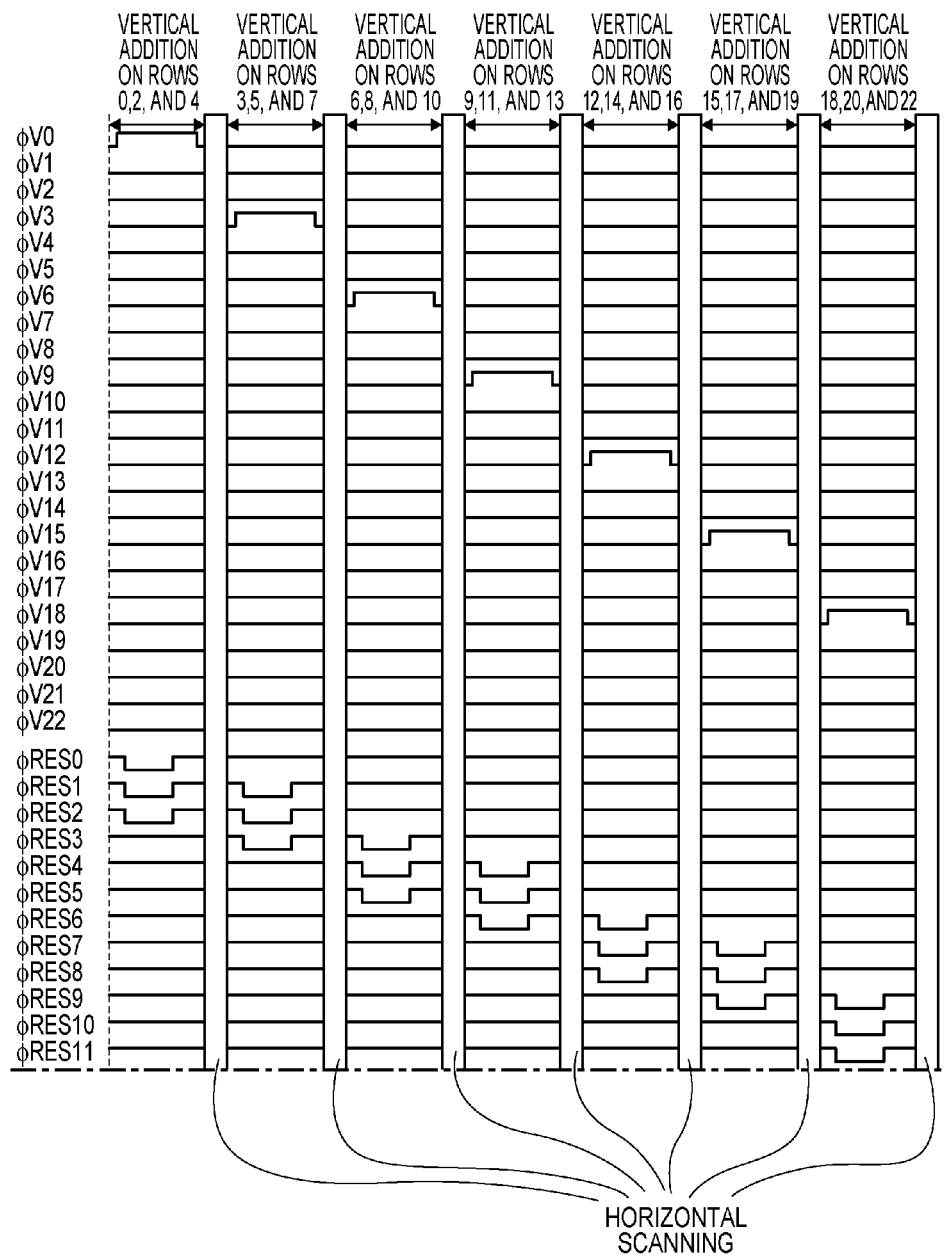
Figure 19C:
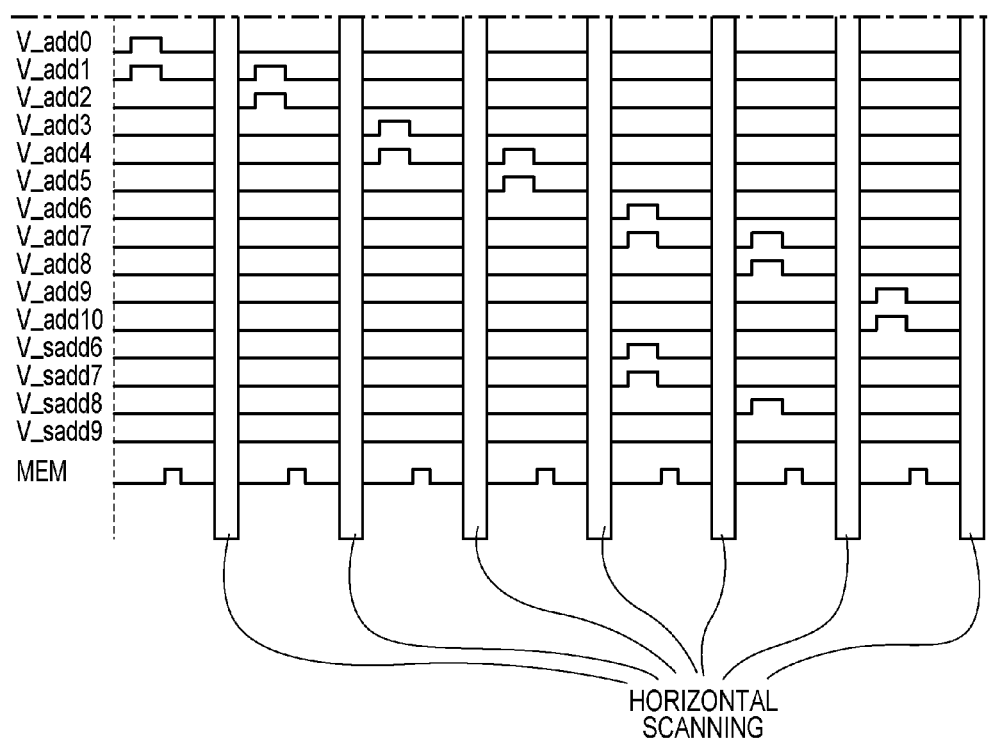

FIGS. 19A to 19C are views for explaining the readout operation of the image sensor in FIG. 17, showing the vertical scanning timing at the time of vertical three-pixel addition readout operation. A description of all pixel readout operation will be omitted.

First of all, the apparatus outputs a vertical scanning signal φV0, and sets signals φRES0, φRES, and φRES2 to L level to turn off the reset MOS transistors on rows 0/1, 2/3, and 4/5. At this time, the apparatus outputs SEL0, φSEL1, and φSEL2 to turn on the pixel selection MOS transistors on rows 0/1, 2/3, and 4/5. In this state, the apparatus sets signals V_add0 and V_add1 to H level to connect the FD capacitors on rows 0/1, 2/3, and 4/5 in parallel, and turns on charge-transfer MOS transistors to transfer the charges in the photodiodes on rows 0, 2, and 4 to the FD capacitors connected in parallel by using signals φTX1_1, φTX1_2, and φTX1_4. After the transfer, the apparatus restores the signals φTX and V_add to L level. Thereafter, the apparatus sets a signal MEM to H level to perform vertical transfer of pixel signals after three-pixel addition to the line memory. Upon completion of the vertical transfer, the apparatus restores the signal φRES to H level, and sets the signals φTX1_0, φTX1_2, and φTX1_4 to H level to reset the photodiodes and the FD capacitors. After resetting, the apparatus restores the signal φTX to L level again to start storing charges in the photodiodes on rows 0, 2, and 4. After vertical transfer, the apparatus performs horizontal scanning, and then completes readout operation on rows 0, 2, and 4.

The apparatus then outputs a vertical scanning signal φV3, and sets signals φRES1, φRES2, and φRES3 to L level to turn off the reset MOS transistors on rows 2/3, 4/5, and 6/7. At this time, the apparatus outputs φSEL1, φSEL2, and φSEL3 to turn on the pixel selection MOS transistors on rows 2/3, 4/5, and 6/7. In this state, the apparatus sets signals V_add1 and V_add2 to H level to connect the FD capacitors on rows 2/3, 4/5, and 6/7 in parallel, and turns on charge-transfer MOS transistors by using signals φTX2_3, φTX2_5, and φTX2_7 to transfer the charges in the photodiodes on rows 3, 5, and 7 to the FD capacitors connected in parallel. After the transfer, the apparatus restores the signals φTX and V_add to L level. Thereafter, the apparatus sets a signal MEM to H level to perform vertical transfer of pixel signals after three-pixel addition to the line memory.

Likewise, the apparatus sequentially performs vertical adding and vertical transfer on rows 6, 8, and 10 and rows 9, 11, and 13, and then performs horizontal scanning, thereby completing readout operation.

Vertical addition control on rows 12, 14, and 16 including the R pixels partly sharing a circuit with the pixel SHB will be described next. First of all, the apparatus outputs a vertical scanning signal φV12, and sets signals φRES6, φRES7, and φRES8 to L level to turn off the reset MOS transistors on rows 12/13, 14/15, and 16/17. At this time, the apparatus outputs φSEL6, φSEL7, and φSEL8 to turn on the pixel selection MOS transistors on rows 12/13, 14/15, and 16/17. In this state, the apparatus sets signals V_add6, V_add7, V_sadd6, and V_sadd7 to H level to connect the FD capacitors on rows 12/13, 14/15, and 16/17 in parallel, and turns or charge-transfer MOS transistors to transfer the charges in the photodiodes on rows 12, 14, and 16 to the FD capacitors connected in parallel by using signals φTX1_12, φTX1_14, and φTX1_16. After the transfer, the apparatus restores the signals φTX, V_add, and V_sadd to L level. Thereafter, the apparatus sets a signal MEM to H level to perform vertical transfer of pixel signals after three-pixel addition to the line memory. In addition, the apparatus turns on V_sadd6 and V_sadd7 of addition MOS transistors to vertically add and output signals from the G pixels partly sharing a circuit with the pixel SHB located on the 14th row. Upon completion of the vertical transfer, the apparatus performs horizontal, scanning to complete readout operation on rows 12, 14, and 16.

Vertical addition control on rows 15, 17, and 19 including the G pixels partly sharing circuits with the pixels SHB and SHA will be described next. First of all, the apparatus outputs a vertical scanning signal. φV15, and sets signals φRES7, φRES8, and φRES9 to L level to turn off the reset MOS transistors on rows 14/15, 16/17, and 18/19. At this time, the apparatus outputs φSEL7, φSEL8, and φSEL9 to turn on the pixel selection MOS transistors on rows 14/15, 16/17, and 18/19. In this state, the apparatus sets signals V_add7, V_add8, and V_sadd9 to H level to connect the FD capacitors on rows 4/15, 16/17, and 18/19 in parallel, and turns on charge-transfer MOS transistors to transfer the charges in the photodiodes on rows 15, 17, and 19 to the FD capacitors connected in parallel by using signals φTX2_15, φTX2_17, and φTX2_19. After the transfer, the apparatus restores the signals φTX, V_add, and V_sadd to L level. Thereafter, the apparatus sets a signal MEM to H level to perform vertical transfer of pixel signals after three-pixel addition to the line memory. In addition, the apparatus turns off V_sadd7 of the addition MOS transistor to independently output a signal from the SHB pixel located on the 15th row. In addition, the apparatus turns on V_sadd8 of the addition MOS transistor to vertically add and output signals from the G pixels partly sharing a circuit with the pixel SHA located on the 19th row. Upon completion of the vertical transfer, the apparatus performs horizontal scanning to complete readout operation on rows 15, 17, and 19.

Vertical addition control on rows 18, 20, and 22 including the pixel SHA will be described next. First of all, the apparatus outputs a vertical scanning signal φV18, and sets signals φRES9, φRES10, and φRES11 to L level to turn off the reset MOS transistors on rows 18/19, 20/21, and 22/23. At this time, the apparatus outputs φSEL9, φSEL10, and φSEL1 to turn on the pixel selection MOS transistors on rows 18/19, 20/21, and 22/23. In this state, the apparatus sets signals V_add9 and V_add10 to H level to connect the FD capacitors on rows 18/19, 20/21, and 22/23 in parallel, and turns on charge-transfer MOS transistors to transfer the charges in the photodiodes on rows 18, 20, and 22 to the FD capacitors connected in parallel by using signals φTX1_18, φTX1_20, and φTX1_21. After the transfer, the apparatus restores the signals φTX and V_add to L level. Thereafter, the apparatus sets a signal MEM to H level to perform vertical transfer of pixel signals after three-pixel addition to the line memory. In addition, the apparatus turns off V_sadd9 of the addition MOS transistor to independently output a signal from the SHA pixel located on the 18th row. Upon completion of the vertical transfer, the apparatus performs horizontal scanning to complete readout operation on rows 18, 20, and 22. Note that operation concerning horizontal scanning is the same as that in the first embodiment.

As has been described above, when two pixels of photodiodes share the circuit of a pixel portion like R/G and G/B, it is possible to independently output signals from focus detecting pixels without vertically adding them, by properly controlling addition MOS transistors sharing the circuit of the pixel portion with the focus detecting pixels using separate control signals. This technique has a merit of being able to vertically add signals from all the general pixels including no focus detecting pixels as targets for addition.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-270794, filed Dec. 3, 2010, which is hereby incorporated by reference herein in its entirety.

The invention claimed is:
1. An image capture apparatus comprising:
   an image sensor in which image forming pixels which receive light beams passing through an exit pupil of an imaging lens and focus detecting pixels which receive light beams from the exit pupil of the imaging lens which is partly light-shielded are arranged;
   a first vertical output unit configured to output a signal from each image forming pixel in a vertical direction of said image sensor;

a second vertical output unit configured to output a signal from each focus detecting pixel in the vertical direction of said image sensor;

a vertical addition unit configured to add signals from a plurality of the image forming pixels in the vertical direction of said image sensor; and a control unit operable in an all pixel readout mode of reading out signals from all pixels of said image sensor without addition and an addition readout mode of making said vertical addition unit add and read out signals from the plurality of image forming pixels, said control unit configured to control, when one of the focus detecting pixels is included in targets for addition in the addition readout mode, said vertical addition unit to add only signals from the image forming pixels excluding the focus detecting pixel, and to make said first vertical output unit and said second vertical output unit simultaneously output the addition signals from the image forming pixels and the signal from the focus detecting pixel.

2. The apparatus according to claim 1, wherein the plurality of image forming pixels are classified into pixels which output luminance information and pixels which output color information, and one of the pixels which outputs the luminance information and one of the pixels which outputs the color information share a circuit provided for each pixel.

3. The apparatus according to claim 2, wherein some pixels of the plurality of pixels which output the color information are replaced with the focus detecting pixels.

4. The apparatus according to claim 1, wherein said vertical addition unit adds signals from the plurality of image forming pixels by short-circuiting floating diffusion portions provided for the image forming pixels.

5. The apparatus according to claim 1, wherein when one of the focus detecting pixels is included in targets for addition by said vertical addition unit, the focus detecting pixel is located at a position corresponding to an end of a group of the plurality of image forming pixels as targets for addition.

6. The apparatus according to claim 1, wherein said second vertical output unit is placed on a column, of columns on which a plurality of pixels of said image sensor are arrayed, which includes the focus detecting pixel.

7. The apparatus according to claim 1, wherein in the addition readout mode, the number of image forming pixels as targets for addition is configured to be changed.

* * * * *